(12) United States Patent
Jung

(10) Patent No.: US 11,693,516 B2
(45) Date of Patent: Jul. 4, 2023

(54) TOUCH DISPLAY DEVICE AND METHOD OF DRIVING THE SAME

(71) Applicant: LG DISPLAY CO., LTD., Seoul (KR)

(72) Inventor: Sojung Jung, Goyang-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 17/507,465

(22) Filed: Oct. 21, 2021

(65) Prior Publication Data
US 2022/0187977 A1    Jun. 16, 2022

(30) Foreign Application Priority Data

Dec. 14, 2020 (KR) .......................... 10-2020-0174182
Mar. 31, 2021 (KR) .......................... 10-2021-0042313

(51) Int. Cl.
*G06F 3/041* (2006.01)
*G06F 3/044* (2006.01)

(52) U.S. Cl.
CPC ........ *G06F 3/04184* (2019.05); *G06F 3/0443* (2019.05); *G06F 3/04166* (2019.05)

(58) Field of Classification Search
CPC . G06F 3/04184; G06F 3/04166; G06F 3/0443
See application file for complete search history.

(56) References Cited

U.S. PATENT DOCUMENTS

| 10,775,921 | B2* | 9/2020 | Cheng ...................... G09G 3/20 |
| 10,838,547 | B1* | 11/2020 | Shen ...................... G06F 3/0412 |
| 11,188,171 | B2* | 11/2021 | Liang ...................... G06F 3/0416 |
| 2013/0106779 | A1* | 5/2013 | Company Bosch .... G06F 3/044 345/174 |
| 2018/0150168 | A1 | 5/2018 | Jung |
| 2020/0020296 | A1 | 1/2020 | Kim et al. |
| 2020/0050339 | A1* | 2/2020 | Choi ...................... G06F 3/0383 |

FOREIGN PATENT DOCUMENTS

KR    10-2015-0027376 A    3/2015
KR    10-2020-0014591 A    2/2020

OTHER PUBLICATIONS

Extended European Search Report dated May 13, 2022 issued by the European Patent Office in counterpart European Patent Application No. 21214508.0.

* cited by examiner

*Primary Examiner* — Bryan Earles
(74) *Attorney, Agent, or Firm* — Morgan, Lewis & Bockius LLP

(57) ABSTRACT

A touch display device may include a touch panel configured to be time-divisionally driven in touch sensing and display periods by a synchronization signal and including touch electrodes, and a touch driver to drive the touch panel. The touch driver may include: a touch sensing circuit to supply a touch driving signal to the touch electrodes, to receive an analog touch sensing signal from the touch electrodes, and to sample an integral value of the analog touch sensing signal to output a digital sensing data; a touch control circuit to generate a pulse width modulation (PWM) signal and to receive the digital sensing data to determine a touch; and a timing control circuit to provide an output signal to the touch sensing circuit to control a sampling timing of the integral value of the analog touch sensing signal.

21 Claims, 28 Drawing Sheets

| Horizontal blank | T1 | T2 | T3 | T4 | T5 | T6 |
|---|---|---|---|---|---|---|
| Touch type | Pen Position 1 | Pen data 1 | Finger 1 | Pen Position 2 | Pen data 2 | Finger 2 |

FIG. 3C

TOUCH DISPLAY DEVICE AND METHOD OF DRIVING THE SAME

CROSS-REFERENCE TO RELATED APPLICATIONS

This application claims the priority of Korean Patent Application No. 10-2020-0174182 filed on Dec. 14, 2020 and Korean Patent Application No. 10-2021-0042313 filed on Mar. 31, 2021, in the Korean Intellectual Property Office, the disclosures of which are incorporated herein by reference as if fully set forth herein.

BACKGROUND

1. Technical Field

The present disclosure relates to a touch display device and, more particularly, to a touch display device configured to output a pulse-width modulated (PWM) touch driving signal and a driving method of the same.

2. Description of the Related Art

As the information society develops, demands for display devices for displaying images in various forms have increased. Recently, various display devices, such as a liquid crystal display (LCD) device, a plasma display panel (PDP), and an organic light emitting display (OLED) device, have been developed and utilized.

Among such display devices is a touch display device employing a touch-based input method to allow a user to input information or commands more easily, intuitively, and conveniently by departing from usual input methods, such as buttons, keyboards, or a mouse.

To provide for the touch-based input method, a touch display device should be able to determine whether there is a touch of a user and detect a touch coordinate (a touch position).

To this end, a capacitance touch method using a plurality of touch electrodes in a touch panel as touch sensors to detect the presence of touch and a touch coordinate based on the change in capacitance between touch electrodes or in capacitance between a touch electrode and a pointer such as a finger is frequently employed.

Further, the touch display device may be time-divisionally driven into a display period and a touch sensing period. During the display period, one frame may be displayed, and during the touch sensing period, a touch on the screen may be sensed.

During the above-described touch sensing period, a pulse-width modulated (PWM) touch driving signal may be transmitted to a touch electrode, and analog touch sensing signal data may be received from the touch electrode to be converted into a digital signal to determine the touch (analog-to-digital converting).

However, there is a potential problem in that, if a switch from the touch sensing period to the display period occurs during the analog-to-digital conversion, a jitter may be generated in the converted digital sensing data due to a source channel toggle for display driving. This may cause degradation in a touch sensing performance.

SUMMARY

An object of the present disclosure is to provide a touch display device capable of suppressing a jitter generated in digital sensing data and a driving method thereof.

Another object of the present disclosure is to provide a touch display device which improves a touch sensing performance and a driving method thereof.

Objects of the present disclosure are not limited to the examples noted above, and other objects may be apparent to or understood by those skilled in the art from the present disclosure, including the detailed description and drawings.

To achieve these and other advantages and in accordance with the purpose of the present disclosure, as embodied and broadly described, a touch display device may comprise: a touch panel configured to be time-divisionally driven in at least one touch sensing period and at least one display period in each of a plurality of frames by a synchronization signal and including a plurality of touch electrodes; and a touch driver configured to drive the touch panel. The touch driver may include: a touch sensing circuit configured to supply a touch driving signal to each of the plurality of touch electrodes, to receive an analog touch sensing signal from each of the plurality of touch electrodes, and to sample an integral value of the analog touch sensing signal based on a sampling timing to output a digital sensing data; a touch control circuit configured to generate a pulse width modulation (PWM) signal having a plurality of pulses and to receive the digital sensing data to determine a touch, the touch driving signal being based on the PWM signal; and a timing control circuit configured to provide an output signal to the touch sensing circuit to control the sampling timing of the integral value of the analog touch sensing signal.

According to another aspect of the present disclosure, for a touch display device which comprises a touch panel configured to be time-divisionally driven into at least one touch sensing period and at least one display period in each of a plurality of frames by a synchronization signal and including a plurality of touch electrodes, and a touch driver configured to drive the touch panel, a method of driving may comprise: generating a pulse width modulation (PWM) signal including a plurality of pulses; outputting a touch driving signal to each of the plurality of touch electrodes, the touch driving signal being based on the PWM signal; receiving an analog touch sensing signal from each of the plurality of touch electrodes; sampling an integral value of the analog touch sensing signal based on a sampling timing and outputting a digital sensing data; determining a touch based on the digital sensing data; and controlling the sampling timing of the integral value of the analog touch sensing signal.

Other details of example embodiments are included in the detailed description and the drawings.

According to the present disclosure, an operation of an analog-to-digital converter may be completed within the touch sensing period so that jitter is not generated in converted digital sensing data, thereby improving a touch sensing performance.

According to the present disclosure, digital sensing data may be compensated by adding sensing data corresponding to a removed pulse of a PWM signal or an unsampled touch sensing data to the digital sensing data, to acquire a more accurate sensing information.

The potential benefits and advantages according to the present disclosure are not limited to the examples listed above, and various additional benefits and advantages may be discussed in or apparent from the present disclosure.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this specification, illustrate embodiments of the disclosure and together with the description serve to explain the principles of the disclosure. In the drawings:

FIG. 3C is a table for explaining a touch type performed in horizontal blank type time-divisional driving of a touch display device according to an example embodiment of the present disclosure;

DETAILED DESCRIPTION

Figure 1:
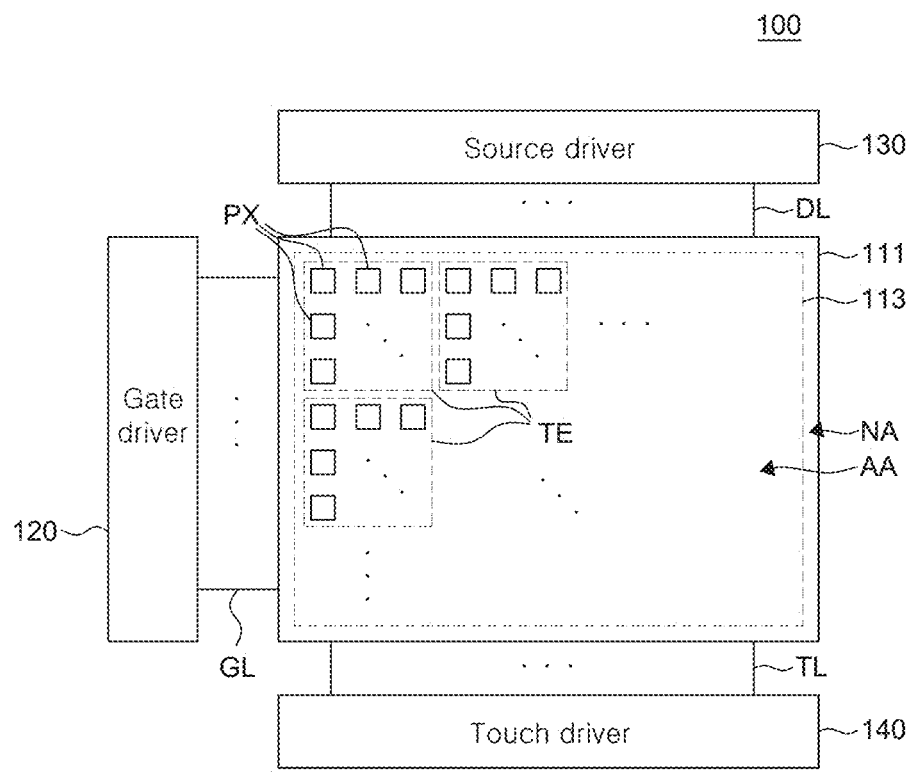
FIG. 1 is a block diagram illustrating a touch display device according to an example embodiment of the present disclosure.

Reference will now be made in detail to embodiments of the present disclosure, examples of which are illustrated in the accompanying drawings.

Advantages and features of the present disclosure, and implementation methods thereof will be clarified through following example embodiments described with reference to the accompanying drawings. The present disclosure may, however, be embodied in different forms and should not be construed as limited to the example embodiments set forth herein. Rather, these example embodiments are provided so that this disclosure may be sufficiently thorough and complete to assist those skilled in the art to fully understand the scope of the present disclosure. Further, the protected scope of the present disclosure is defined by claims and their equivalents.

A shape, a size, a ratio, an angle, and a number disclosed in the drawings for describing embodiments of the present disclosure are merely an example. Thus, the present disclosure is not limited to the illustrated details.

In the following description, when the detailed description of the relevant known function or configuration is determined to obscure an important point of the present disclosure unnecessarily, the detailed description of such known function or configuration may be omitted.

In a case where terms "comprise," "have," and "include" described in the present specification are used, another part may be added unless a more limiting term, such as "only," is used. The terms of a singular form may include plural forms unless referred to the contrary.

In construing an element, the element is construed as including an error or tolerance range even where no explicit description of such an error or tolerance range is provided.

In describing a position relationship, when a position relation between two parts is described as, for example, "on," "over," "under," or "next," one or more other parts may be disposed between the two parts unless a more limiting term, such as "immediate(ly)" or "direct(ly)," is used. For example, when an element or layer is disposed "on" another element or layer, a third layer or element may be interposed therebetween.

Although the terms "first," "second," and the like may be used herein to describe various elements, these elements should not be limited by these terms as they are not used to define a particular order. These terms are used only to distinguish one element from another. For example, a first element could be termed a second element, and, similarly, a second element could be termed a first element, without departing from the scope of the present disclosure.

Unless otherwise described, like reference numerals generally denote like elements throughout the specification.

A size and a thickness of each component illustrated in the drawings are illustrated for convenience of description, and the present disclosure is not limited to the particular size or thickness of the component as illustrated, unless otherwise stated.

Features of various embodiments of the present disclosure may be partially or overall coupled to or combined with each other, and may be variously inter-operated with each other and driven technically, as those skilled in the art can sufficiently understand. Embodiments of the present disclosure may be carried out independently from each other or may be carried out in association with each other.

A low level of a signal may be defined as a first level and a high level of a signal may be defined as a second level, or vice versa.

Hereinafter, a touch display device and a method of driving a touch display device according to example embodiments of the present disclosure will be described in detail with reference to accompanying drawings.

FIG. 1 is a block diagram illustrating a touch display device according to an example embodiment of the present disclosure.

As shown in FIG. 1, a touch display device 100 may include a display panel 111, a touch panel 113, a gate driver 120, a source driver 130, and a touch driver 140.

The display panel 111 may include a substrate using glass or plastic (not illustrated) and a plurality of gate lines GL and a plurality of data lines DL disposed on the substrate to intersect each other. A plurality of pixels PX may be defined at the intersections of the plurality of gate lines GL and the plurality of data lines DL. An area in which a plurality of pixels implementing images is disposed is referred to as a display area AA. An area disposed outside of the display area AA and in which the plurality of pixels PX is not disposed is referred to as a non-display area NA.

Each of the plurality of pixels PX of the display panel 111 may include at least one thin film transistor (not illustrated).

Further, if the touch display device 100 according to the example embodiment of the present disclosure is an electroluminescent display device, a current may be applied to an electroluminescent diode equipped in the plurality of pixels PX, and discharged electrons and holes may be coupled to generate excitons. The excitons may emit light to implement a gray scale of the electroluminescent display device.

However, the touch display device 100 according to the example embodiment of the present disclosure is not limited to the electroluminescent display device and may instead be one of various other types of display devices, such as a liquid crystal display device.

The touch panel 113 is configured to sense a touch input of a user. Specifically, the touch panel 113 may include a plurality of touch electrodes TE, and each touch electrode TE may sense the touch of the user. Here, the touch electrode TE may be formed to have a size corresponding to a size of the plurality of pixels PX.

The touch panel 113 may be manufactured separately from the display panel 111 to be attached onto the display panel 111 as an add-on type or may be embedded in the display panel 111, e.g., as in an integrated type touch display panel.

Specifically, if the touch panel 113 is embedded in the display panel 111, the plurality of touch electrodes TE may be disposed as an in-cell type or an on-cell type. In this case, the touch electrode TE may be formed during the manufacturing process of the display panel 111.

For example, the plurality of touch electrodes TE disposed on the touch panel 113 may be common electrodes corresponding to the plurality of pixels PX. As a more specific example, cathodes of the plurality of electroluminescent diodes disposed in the plurality of pixels PX may correspond to the touch electrodes TE.

The gate driver 120 may sequentially supply a gate voltage of an on-voltage or an off-voltage to gate lines GL in accordance with a gate control signal GCS output from a timing controller.

The gate control signal may include a gate start pulse, a gate shift clock, a gate output enable signal, and the like.

The above-described gate start pulse may control an operation start timing of one or more gate circuits which configure the gate driver 120. The gate shift clock is a clock signal which is commonly input to one or more gate circuits and controls a shift timing of the scan signal (gate pulse). The gate output enable signal may designate timing information of one or more gate circuits.

According to an example driving method employed, the gate driver 120 may be located only at one side of the display panel 111 or located at both sides as appropriate.

The gate driver 120 may include a shift register, a level shifter, and the like.

The source driver 130 may convert digital image data applied from an external system into an analog data voltage Vdata based on the data control signal to output the converted analog data voltage to the data line DL.

The above-described data control signal may include a source start pulse, a source sampling clock, a source output enable signal, and the like.

The above-described source start pulse may control a data sampling start timing of one or more data circuits which configure the source driver 130. The source sampling clock is a clock signal which controls a sampling timing of data in each data circuit. The source output enable signal may control an output timing of the source driver 130.

The source driver 130 may be connected to a bonding pad of the display panel 111 by a tape automated bonding method or a chip on glass method, or may be directly disposed on the display panel 111. As an example, the source driver 130 may be disposed to be integrated in the display panel 111.

The source driver 130 may include a logic unit including various circuits, such as a level shifter or a latch unit, a digital analog converter DAC, an output buffer, and the like.

The touch driver 140 may be electrically connected to the touch electrode TE through the touch line TL to determine whether there is a touch of the user and a touch position. That is, when the user touches a part of the touch panel 113, the touch driver 140 senses a touch signal of the touch electrode TE to determine whether the user touches the touch panel 113 and a touch position.

Specifically, the touch driver 140 may supply the touch driving signal to each touch electrode TE. The touch driver 140 may be applied with a touch sensing signal from each touch electrode TE. The touch driver 140 may sense the touch in the touch panel 113 by the touch sensing signal described above.

The touch driver 140 may be combined with the source driver 130 into one combined driver. Therefore, one combined driver not only may convert digital image data applied from the external system into analog data voltage Vdata based on the data control signal to output the converted analog data voltage to the data line DL, but also may be connected to the touch electrode TE through the touch line TL to determine whether there is a touch of the user and the touch position.

Here, a method of sensing the touch using each touch electrode TE may be classified into a mutual capacitance type configured to sense the change in mutual capacitance of the touch electrode TE and a self-capacitance type configured to sense the change in self-capacitance of the touch electrode TE.

Hereinafter, for convenience and brevity, the touch display device 100 according to the example embodiments of the present disclosure will be described as a self-capacitance type. However, the touch driving type of the touch display device 100 according to the example embodiments of the present disclosure is not limited to the self-capacitance type and may instead be a mutual capacitance type configured to sense the change in the mutual capacitance of the touch electrode TE.

Figure 2:
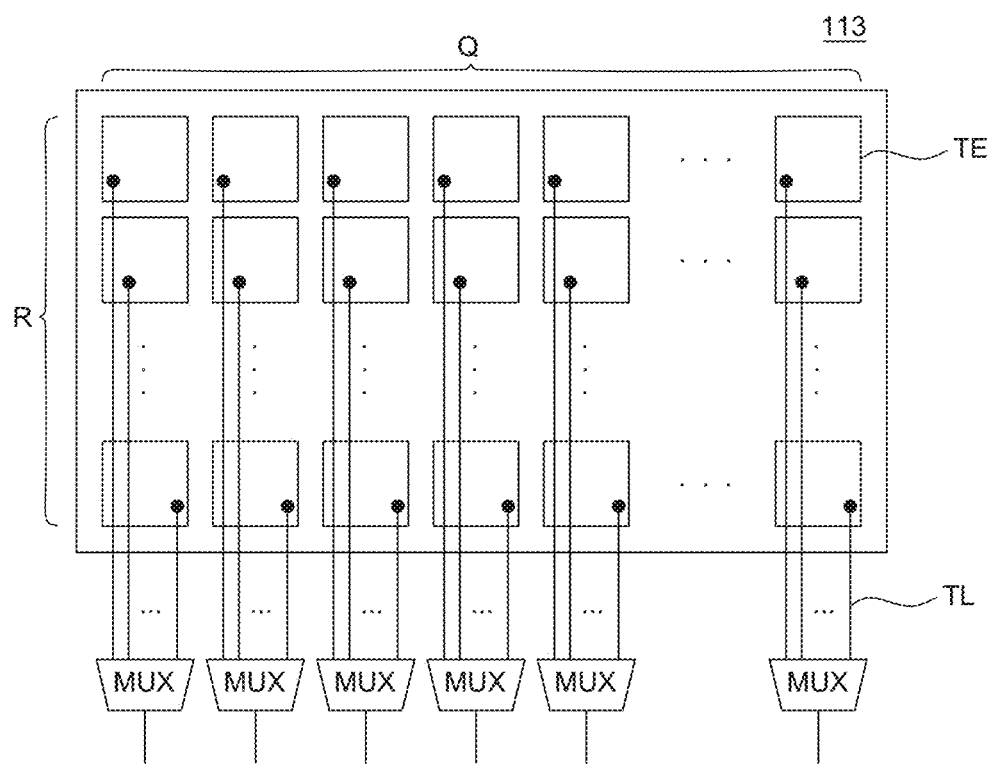
FIG. 2 is a diagram for explaining a touch panel according to an example embodiment of the present disclosure.

FIG. 2 is a diagram for explaining a touch panel according to an example embodiment of the present disclosure.

As illustrated in FIG. 2, the touch panel 113 may include a plurality of touch electrodes TE disposed in a matrix. For example, in FIG. 2, a plurality of touch electrodes TE disposed in a Q×R matrix is illustrated. Here, Q and R are natural numbers of 1 or larger, respectively.

The plurality of touch electrodes TE may be electrically connected to a plurality of multiplexers MUX included in the touch driver (see, e.g., 140 in FIG. 1), by means of the plurality of touch lines TL. Specifically, each of the plurality of touch electrodes TE may be electrically connected to a corresponding MUX by means of at least one touch line TL.

That is, in FIG. 2, even though each of the plurality of touch electrodes TE is illustrated as being connected to one corresponding touch line TL, the present disclosure is not limited thereto. Each of the plurality of touch electrodes TE may instead be connected to a plurality of touch lines TL.

To be more specific, the plurality of touch electrodes TE disposed in one column may be connected to one MUX. For example, as illustrated in FIG. 2, the touch panel 113 includes Q columns of touch electrodes TE so that each of Q columns of touch electrodes TE may be connected to a respective one of Q MUXs.

For example, as illustrated in FIG. 2, R touch electrodes TE disposed in one column may be connected to a corresponding MUX. Alternatively, Q touch electrodes TE disposed in one row may be connected to a corresponding MUX. However, the present disclosure is not limited thereto. R/2 touch electrodes TE disposed in an upper portion, among R touch electrodes TE disposed in one column, may be connected to one MUX. Further, R/2 touch electrodes TE disposed in a lower portion, among R touch electrodes TE disposed in one column, may be connected to another MUX. Alternatively, Q/2 touch electrodes TE disposed at a left side, among Q touch electrodes TE disposed in one row, may be connected to one MUX. Further, Q/2 touch electrodes TE disposed at a right side, among Q touch electrodes TE disposed in one row, may be connected to another MUX.

Touch electrodes TE may be formed by patterning a conductive metal layer. For example, the touch electrodes TE may be formed of a transparent material, such as indium tin oxide ITO. Accordingly, light emitted from the display device 100 may pass through the touch electrodes TE formed of ITO to be emitted out of the display device 100. However, the present disclosure is not limited thereto, and the touch electrodes TE, for example, may include an electrode pattern formed with a mesh pattern or may be formed of an opaque metal material having a good conductivity corresponding to a cathode of an electroluminescent diode.

Figure 3A:
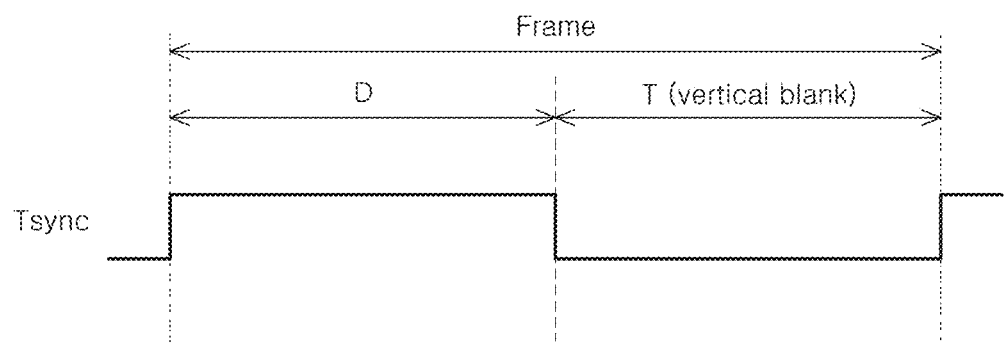
FIG. 3A is a diagram for explaining a vertical blank type time-divisional driving of a touch display device according to an example embodiment of the present disclosure.

FIG. 3A is a diagram for explaining vertical blank type time-divisional driving of a touch display device according to an example embodiment of the present disclosure.

Figure 3B:
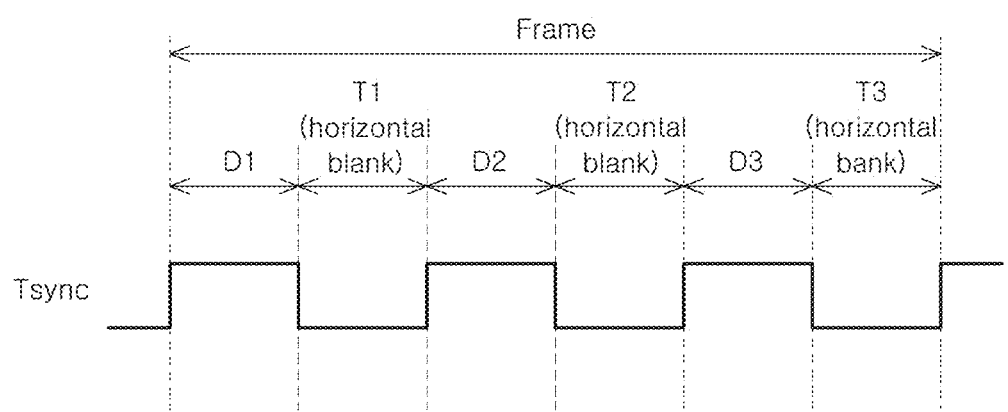
FIG. 3B is a diagram for explaining a horizontal blank type time-divisional driving of a touch display device according to an example embodiment of the present disclosure.

FIG. 3B is a diagram for explaining horizontal blank type time-divisional driving of a touch display device according to an example embodiment of the present disclosure.

FIG. 3C is a table for explaining a touch type performed in horizontal blank type time-divisional driving of a touch display device according to an example embodiment of the present disclosure.

The touch display device 100 may have operation modes including a display mode and a touch sensing mode. One frame period may be divided in time into one or more display periods D corresponding to the display mode and one or more touch sensing periods T corresponding to the touch sensing mode. For example, when a synchronization signal Tsync is at a low level, the touch display device 100 may be in a touch sensing period T. When the synchronization signal Tsync is at a high level, the touch display device 100 may be in a display period D. However, the present disclosure is not limited thereto. As another example, the touch display device 100 may be in a touch sensing period T when the synchronization signal Tsync is at a high level and in a display period D when the synchronization signal Tsync is at a low level.

The above-described synchronization signal Tsync may be generated in the timing controller to be output to the source driver 130 and the touch driver 140. Therefore, in accordance with the level of the synchronization signal Tsync, the source driver 130 and the touch driver 140 may drive the touch display device 100 in the display mode D or the touch sensing mode T.

For example, as illustrated in FIG. 3A, if the touch display device 100 operates in a vertical blank driving manner, one frame period may include one display period D and one touch sensing period T. During the display period D, images corresponding to one frame may be displayed. During the touch sensing period T, the touch driving signal may be output to the touch electrodes TE so that the touch in the entire area or a partial area of the touch panel 113 may be sensed. The touch driving signal may be a pulse width modulation (PWM) signal including a plurality of pulses.

As illustrated in FIG. 3B, if the touch display device 100 operates in a horizontal blank driving manner, one frame period may be time-divided into a plurality of display periods D1, D2, and D3, and a plurality of touch sensing periods T1, T2, and T3. Therefore, one frame may be displayed during the plurality of display periods D1, D2, and D3. and the touch in the entire area or a partial area of the touch panel 113 may be sensed during the plurality of touch sensing periods T1, T2, and T3. The number of display periods and touch sensing periods may be greater than 3.

Also as an example, different types of touch sensing may be performed during each of the plurality of touch sensing periods, e.g., T1, T2, T3, T4, T5, and T6.

Specifically, as illustrated in FIG. 3C, during a first touch sensing period T1, a pen position 1 of a first pen may be sensed. During a second touch sensing period T2, pen data 1 of the first pen may be sensed. During a third touch sensing period T3, a position Finger 1 of a finger in a first area may be sensed. Further, during a fourth touch sensing period T4, a pen position 2 of a second pen may be sensed. During a fifth touch sensing period T5, pen data 2 of the second pen may be sensed. During a sixth touch sensing period T6, a position Finger 2 of a finger in a second area may be sensed. For reference, pen data may collectively refer to a touch force of the pen, a thickness of the pen, a strength of the pen, and the like.

That is, in this example, when the pen position and the pen data are sensed in each of the plurality of touch sensing periods T1, T2, T4, and T5, positions and data for a plurality of pens may be sensed in the entire area. In contrast, when the position Finger of the finger is sensed in each of the plurality of touch sensing periods T3 and T6, a position of the finger may be sensed only in a partial area of the display area AA.

Regarding this example, a frequency of a touch driving signal suitable for pen position sensing, a frequency of a touch driving signal suitable for pen data sensing, and a frequency of a touch driving signal suitable for finger position sensing may be different from each other. Therefore, frequencies of touch driving signals output in the first touch sensing period T1 and the fourth touch sensing period T4, frequencies of touch driving signals output in the second touch sensing period T2 and the fifth touch sensing period T5, and frequencies of touch driving signals output in the third touch sensing period T3 and the sixth touch sensing period T6 may be different from each other.

Even though FIG. 3C illustrates the pen position sensing, the pen data sensing, and the finger position sensing as being sequentially and repeatedly performed in every period of the plurality of touch sensing periods T1, T2, T3, T4, T5, and T6, the present disclosure is not limited thereto. Depending on the design of the touch display device, during the plurality of touch sensing periods, at least one pen position sensing, at least one pen data sensing, and at least one finger position sensing may be randomly performed.

Figure 4:
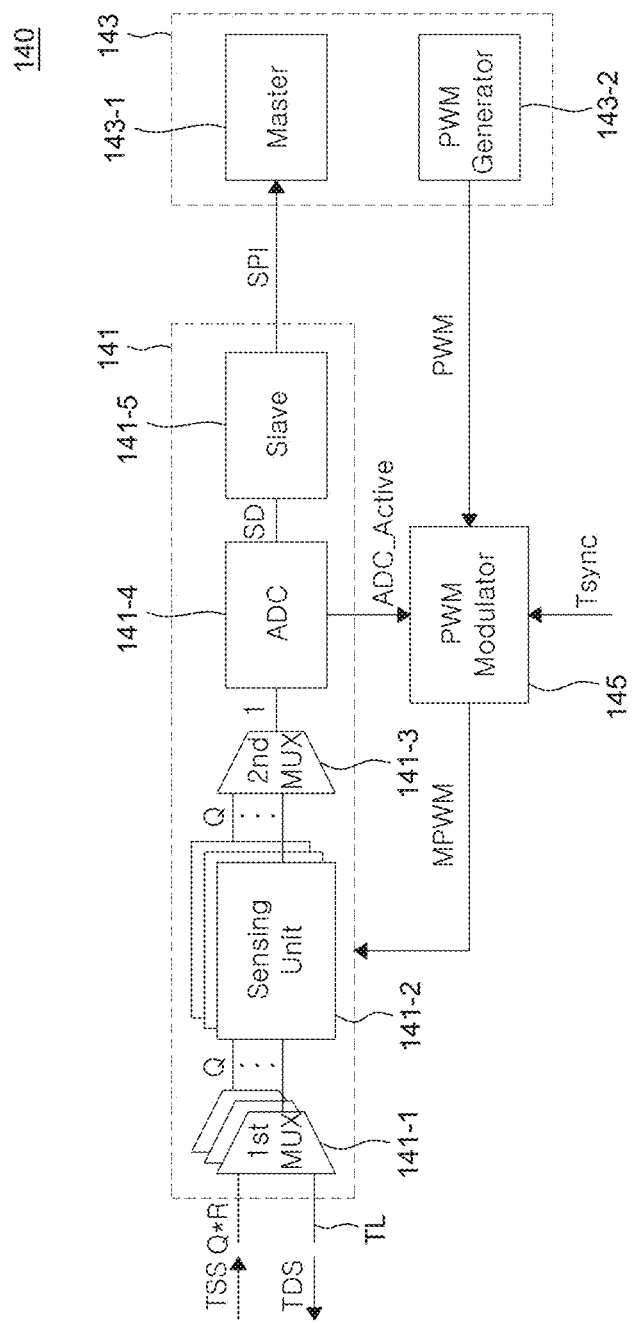
FIG. 4 is a diagram for explaining a touch driver of a touch display device according to an example embodiment of the present disclosure.

FIG. 4 is a diagram for explaining a touch driver of a touch display device according to an example embodiment of the present disclosure.

Figure 5:
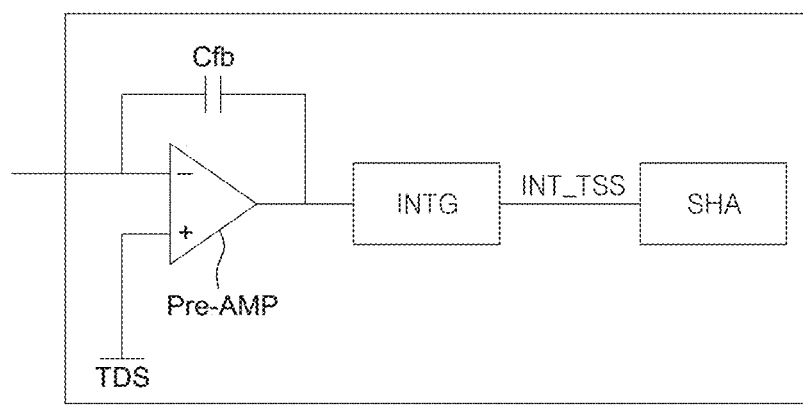
FIG. 5 is a diagram for explaining a sensing unit of a touch display device according to an example embodiment of the present disclosure.

FIG. 5 is a diagram for explaining a sensing unit of a touch display device according to an example embodiment of the present disclosure.

In the touch display device according to the example embodiment of the present disclosure, the touch driver 140 may include a touch sensing circuit 141, a touch control circuit 143, and a PWM modulator 145. The above-described touch sensing circuit 141 may be disposed in the form of an integrated circuit IC, and the touch control circuit 143 may be disposed in the form of a micro control unit MCU.

The touch sensing circuit 141 may detect a touch sensing signal TSS, which may vary depending on whether there is a touch, by driving the touch panel 113.

Specifically, the touch sensing circuit 141 may output a touch driving signal TDS to two or more touch electrodes TE, and may convert an analog touch sensing signal TSS detected by each touch electrode TE applied with the touch driving signal TDS into digital sensing data SD to transmit the converted digital sensing data to the touch control circuit 143.

That is, the touch sensing circuit 141 may perform analog to digital conversion to convert the analog touch sensing signal TSS detected by each touch electrode TE applied with the touch driving signal TDS into digital sensing data SD.

As illustrated in FIG. 4, the touch sensing circuit 141 may include a plurality of first multiplexers 141-1, a plurality of sensing units 141-2, a second multiplexer 141-3, an analog to digital converter (ADC) 141-4, and a slave processor 141-5.

Each of the plurality of first multiplexers 141-1 may select one touch sensing signal TSS among a plurality of touch sensing signals TSS output from one column of touch electrodes TE. Specifically, each of the plurality of first multiplexers 141-1 may be connected to a plurality of touch lines TL connected to one column of touch electrodes TE and perform a R:1 multiplexing. For example, Q first multiplexers 141-1 may select Q touch sensing signals TSS among touch sensing signals TSS received from the plurality of touch electrodes TE disposed in the Q×R matrix.

The above-described Q first multiplexers may be Q MUXs connected to Q columns of touch electrodes TE illustrated in FIG. 2.

The plurality of sensing units 141-2 may integrate a plurality of touch sensing signals TSS, respectively, and each sample an integral value INT_TSS of the corresponding touch sensing signal. Each of the plurality of sensing units 141-2 may output the touch driving signal TDS to the corresponding touch electrode or electrodes TE of the touch panel 113.

Further, each of the plurality of sensing units 141-2 may be connected to a respective one of the plurality of first multiplexers 141-1 one-to-one to integrate the corresponding touch sensing signal TSS selected by the first multiplexer 141-1 or output the touch driving signal TDS through the first multiplexer 141-1.

For example, Q sensing units 141-2 may be connected to Q first multiplexers 141-1, respectively, on a one-to-one basis.

As shown in FIG. 5, each of the plurality of sensing units 141-2 may include a preamplifier Pre-AMP, an integrator INTG, and a sample and hold circuit SHA.

The preamplifier Pre-AMP may store a charge corresponding to a capacitance formed between the touch electrode TE and a touched object. Specifically, a charge corresponding to a capacitance formed between the touch electrode TE and a touched object may be stored in a feedback capacitor Cfb of the preamplifier Pre-AMP.

The preamplifier Pre-AMP may output the input touch driving signal TDS to the touch electrode TE through the first multiplexer 141-1.

The integrator INTG may output an integral value INT_TSS of the touch sensing signal which is an output voltage of the preamplifier Pre-AMP. Such an integrator INTG may be configured by elements such as a comparator or a capacitor. A signal output from the integrator INTG may be input to the sample and hold circuit SHA.

The sample and hold circuit SHA may be a circuit configured to sample and hold the integral value INT_TSS of the touch sensing signal and to hold the integral value INT_TSS of the touch sensing signal until the analog to digital converter (ADC) 141-4 ends a previous conversion.

As shown in FIG. 4, the second multiplexer 141-3 may select one touch sensing signal TSS among a plurality of touch sensing signals TSS output from the plurality of sensing units 141-2. Specifically, the second multiplexer 141-3 may be a circuit which is connected to the plurality of sensing units 141-2 and performs a Q:1 multiplexing. For example, the second multiplexer 141-3 may select one of Q sensing units 141-2 to input a voltage held in the sample and hold circuit SHA of the selected sensing unit 141-2 to the analog to digital converter (ADC) 141-4.

The analog to digital converter (ADC) 141-4 may convert the input voltage into digital sensing data SD to output the converted digital sensing data.

The output digital sensing data SD may be transmitted to the touch control circuit 143 via the slave processor 141-5 of the touch sensing circuit 141.

In the period in which the analog to digital converter (ADC) 141-4 converts the integral value INT_TSS of the touch sensing signal into digital sensing data SD, the analog to digital converter (ADC) 141-4 may output an ADC active signal ADC_Active to the PWM modulator 145. That is, during the period in which the analog to digital converter (ADC) 141-4 outputs the integral value INT_TSS of the touch sensing signal as digital sensing data SD, the ADC active signal ADC_Active may be at a high level.

In other words, only during the period in which the ADC active signal ADC_Active is at a high level, the integral value INT_TSS of the analog touch sensing signal may be applied to the analog to digital converter 141-4 and be converted into the digital sensing data SD.

In summary, during the touch driving operation, the analog to digital conversion, and the sensing data SD transmission, the touch sensing circuit 141 may perform the analog to digital conversion after performing the touch driving operation. Further, the touch sensing circuit 141 may sequentially (serially) perform the sensing data SD transmission after completing all the analog to digital conversion.

The touch control circuit 143 may generate a PWM signal PWM including a plurality of pulses and receive the digital sensing data SD to determine touch information about the presence of touch and a touch position based thereon.

The touch control circuit 143 may include a master processor 143-1, a PWM generator 143-2, and the like.

The slave processor 141-5 of the touch sensing circuit 141 and the master processor 143-1 of the touch control circuit 143 may form a master-slave architecture, and transmit and receive data therebetween via a communication interface I/F.

The communication interface I/F between the touch sensing circuit 141 and the touch control circuit 143 may be a serial peripheral interface SPI.

The serial peripheral interface SPI may be an interface operating in a full duplex mode which is a synchronous serial data connection scheme and is a communication scheme in which the touch sensing circuit 141 and the touch control circuit 143 may simultaneously use independent lines to transmit and receive data.

The PWM generator 143-2 may provide the PWM signal including a plurality of pulses to the PWM modulator 145. Specifically, the PWM generator 143-2 may supply the PWM signal PWM including a plurality of pulses to the PWM modulator 145 during the touch sensing period.

Figure 6:
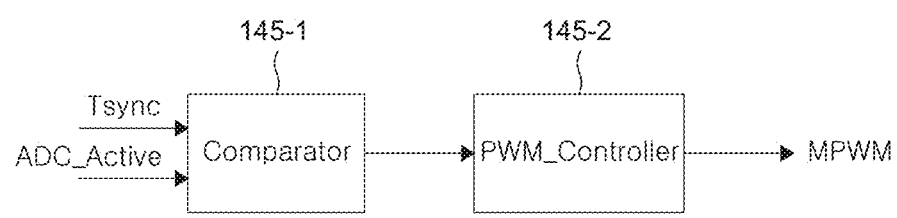
FIG. 6 is a diagram for explaining a PWM modulator of a touch display device according to an example embodiment of the present disclosure.

FIG. 6 is a diagram for explaining a PWM modulator 145 of a touch display device according to an example embodiment of the present disclosure.

The PWM modulator 145 may adjust the number of pulses in the PWM signal PWM depending on the ADC active signal ADC_Active and the synchronization signal Tsync overlap. That is, PWM modulator 145 may remove at least one pulse among the plurality of pulses in the PWM signal PWM only when an operation period of the analog to digital converter ADC and a display period D overlap.

The PWM modulator 145 may output a modified PWM signal MPWM to the plurality of sensing units 141-2.

Specifically, as illustrated in FIG. 6, the PWM modulator 145 may include a comparator 145-1 which compares the ADC active signal ADC_Active and the synchronization signal Tsync to determine whether the signals overlap. The PWM modulator 145 may also include a PWM controller 145-2 which adjusts the number of pulses in the PWM signal PWM.

The comparator 145-1 may be applied with the ADC active signal ADC_Active and the synchronization signal Tsync. When both the ADC active signal ADC_Active and the synchronization signal Tsync are at high levels, the comparator 145-1 may generate a high level overlap signal OS. When any one of the ADC active signal ADC_Active and the synchronization signal Tsync is at a low level, the comparator 145-1 may generate a low level overlap signal OS.

The above-described operation of the comparator 145-1 is based on an example implementation in which the synchronization signal Tsync is at a low level in a touch sensing period T and at a high level in a display period D.

However, the present disclosure is not limited to the above example implementation. For example, the synchronization signal Tsync may be at a high level in a touch sensing period T and at a low level in a display period D. In this alternative example, the operation of the comparator 145-1 may be as follows.

When the ADC active signal ADC_Active is at a high level and the synchronization signal Tsync is at a low level, the comparator 145-1 may generate a high level overlap signal OS. In contrast, when both the ADC active signal ADC_Active and the synchronization signal Tsync are at low levels, the comparator 145-1 may generate a low level overlap signal OS.

When the overlap signal OS is at a high level, the PWM controller 145-2 may remove at least one of the plurality of pulses in the PWM signal PWM. Specifically, when the overlap signal OS is at a high level, the PWM controller 145-2 may sequentially remove the last pulse among the plurality of pulses in the PWM signal PWM.

Even though FIG. 4 illustrates that the PWM modulator 145 is disposed separately from the touch sensing circuit 141 and the touch control circuit 143, the present disclosure is not limited thereto. For example, the PWM modulator 145 may instead be included in an integrated circuit IC type touch sensing circuit 141 or a micro control unit MCU type touch control circuit 143.

Hereinafter, the operation of the PWM modulator of the touch display device according to an example embodiment of the present disclosure will be described with reference to FIGS. 7A to 7D.

FIGS. 7A to 7D are diagrams for explaining an operation of a PWM modulator of a touch display device according to an example embodiment of the present disclosure.

Figure 7A:
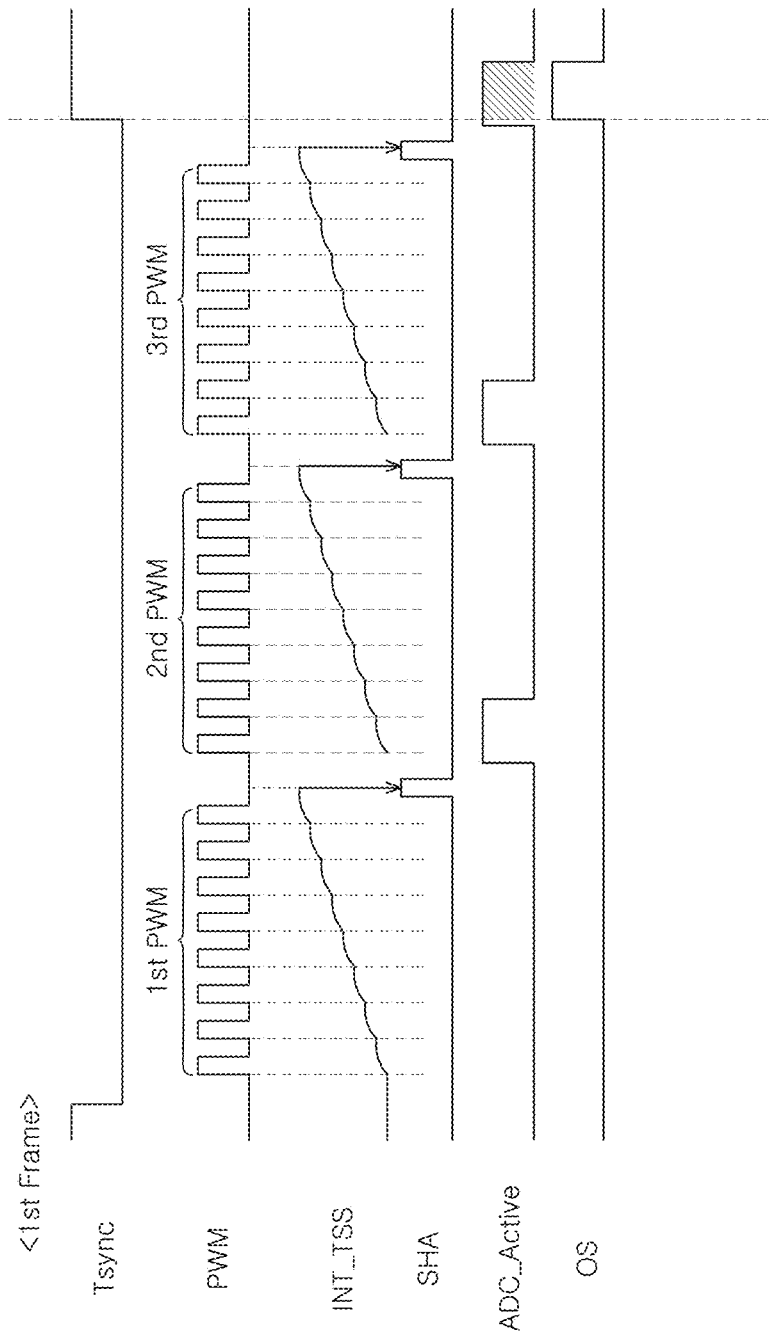
FIGS. 7A to 7D are timing diagrams for explaining an operation of a PWM modulator of a touch display device according to an example embodiment of the present disclosure.
Figure 7B:
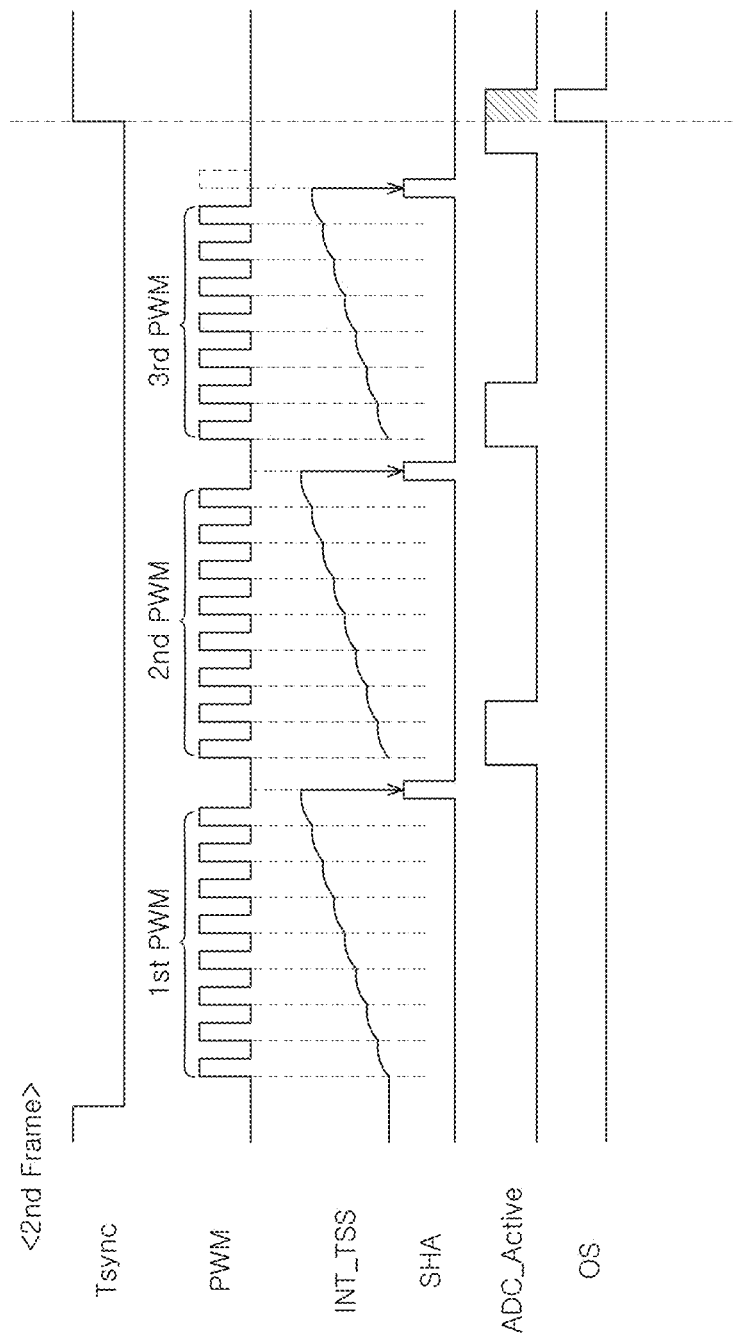
Figure 7C:
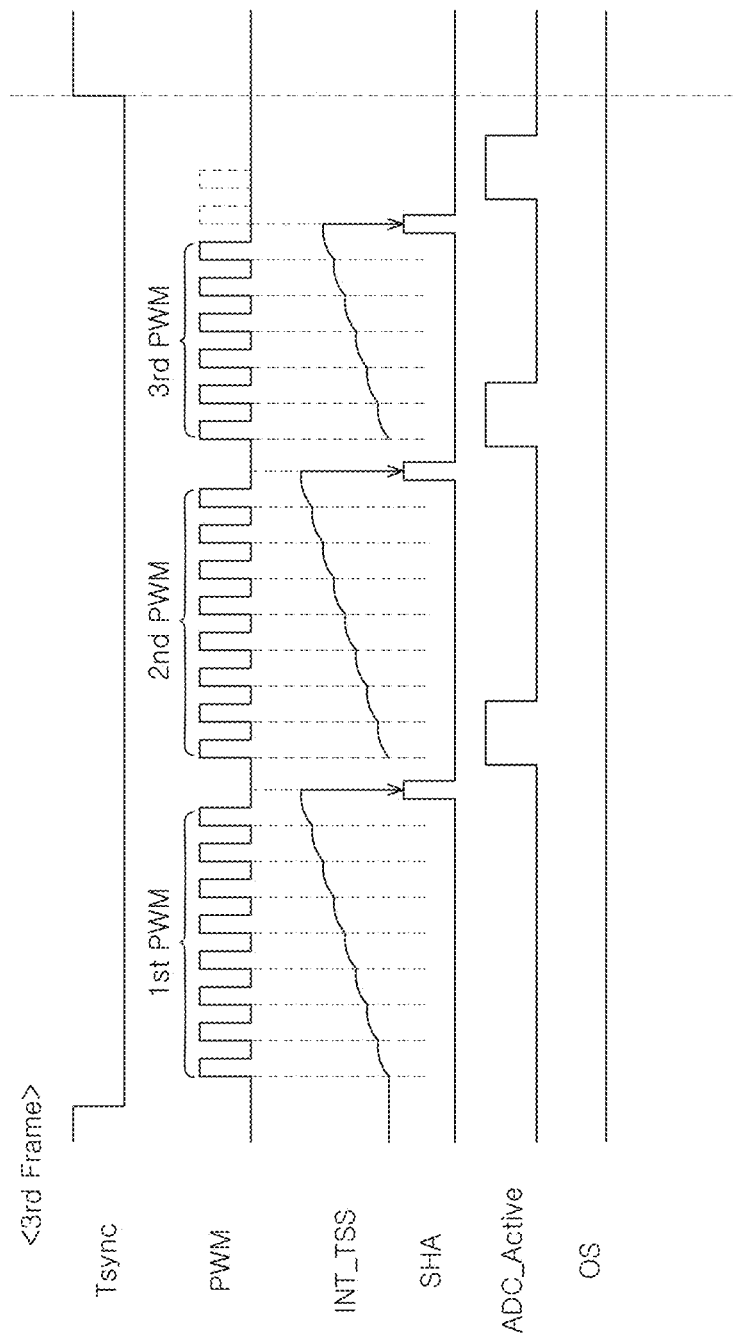
Figure 7D:
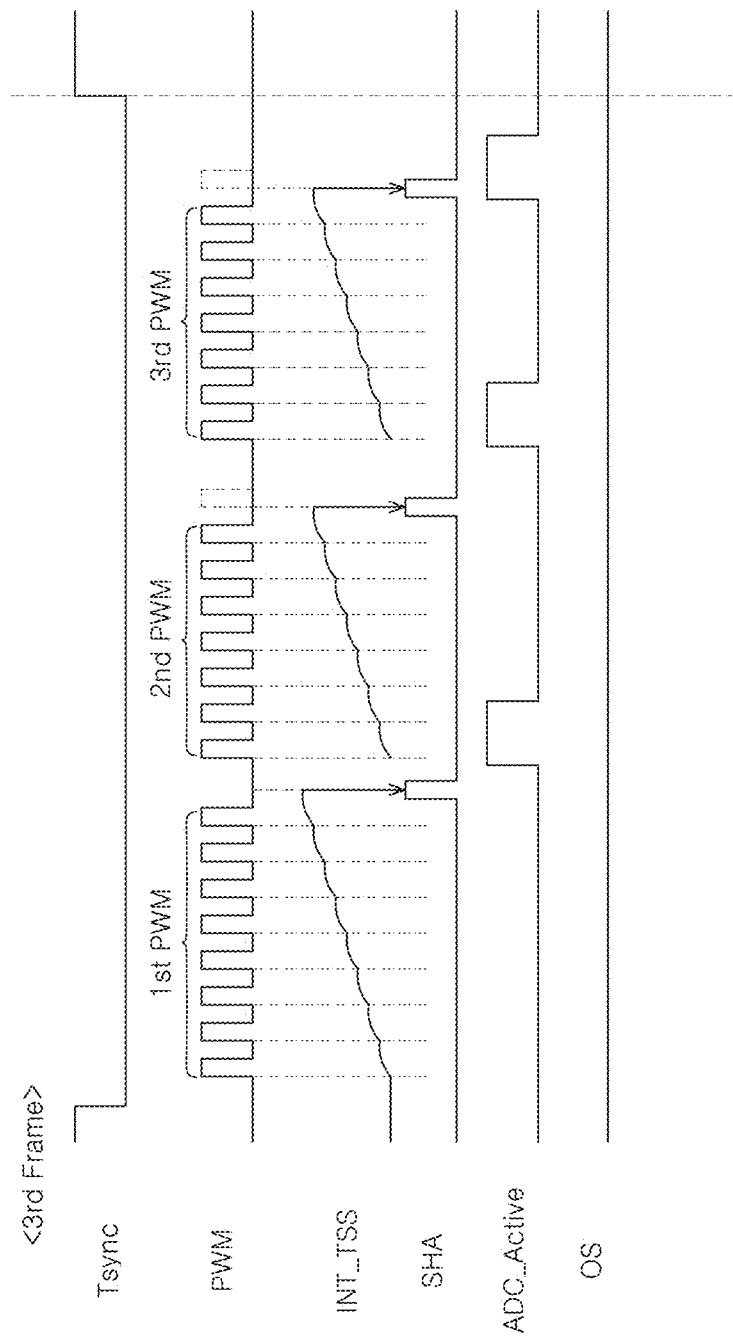

Specifically, FIG. 7A illustrates various signals for touch sensing in a touch sensing period of a first frame period $1^{st}$ Frame. FIG. 7B illustrates various signals for touch sensing in a touch sensing period of a second frame period $2^{nd}$ Frame. FIGS. 7C and 7D illustrate various signals for touch sensing in a touch sensing period of a third frame period $3^{rd}$ Frame.

As shown in FIG. 7A, during the touch sensing period of the first frame period $1^{st}$ Frame, a plurality of PWM signals PWM may be transmitted to the touch sensing circuit 141.

For example, three PWM signals PWM are illustrated. A first PWM signal $1^{st}$ PWM may be output to the corresponding touch electrode(s) TE via a first sensing unit 141-2 and a first one of the first multiplexers 141-1, as a touch driving signal TDS. A second PWM signal $2^{nd}$ PWM may be output to the corresponding touch electrode(s) TE via a second sensing unit 141-2 and a second one of the first multiplexers 141-1, as a touch driving signal TDS. A third PWM signal $3^{rd}$ PWM may be output to the corresponding touch electrode(s) TE via a third sensing unit 141-2 and a third one of the first multiplexers 141-1, as a touch driving signal TDS.

In the first frame period $1^{st}$ Frame, the synchronization signal Tsync may fall from a high level to a low level so that the operation mode of the touch display device 100 is changed from the display mode to the touch sensing mode.

In the above description, the operation is based on an example implementation that the synchronization signal Tsync is at a low level in a touch sensing period T and at a high level in a display period D. However, the present disclosure is not limited thereto. In another example, the synchronization signal Tsync may be at a high level in a touch sensing period T and at a low level in a display period D. In this alternative example, when the synchronization signal Tsync rises from a low level to a high level, the operation mode of the touch display device 100 may be changed from the display mode to the touch sensing mode.

Next, the touch driving signal TDS may be generated using the first PWM signal $1^{st}$ PWM and be output to a first touch electrode TE column. After a falling edge of the last pulse of the first PWM signal $1^{st}$ PWM, the sample and hold circuit SHA of the first sensing unit 141-2 may be driven to sample and hold the integral value INT_TSS of the touch sensing signal. The analog to digital converter (ADC) 141-4 may receive the integral value INT_TSS of the analog touch sensing signal to convert the integral value into the digital sensing data SD. At this time, the analog to digital converter (ADC) 141-4 may output a high level ADC active signal ADC_Active.

In summary, as described above, the ADC active signal ADC_Active may be a square wave signal which is at a high level only while the analog to digital converter 141-4 converts the integral value INT_TSS of the touch sensing signal into the sensing data SD and is otherwise at a low level. That is, the ADC active signal ADC_Active may be a square wave indicating whether the analog to digital converter 141-4 is actively operating. In contrast, the digital sensing data SD may be obtained by the analog to digital converter 141-4 converting the integral value INT_TSS of the analog touch sensing signal into a digital form. Thus, the digital sensing data is not in a simple square form and may instead be a predetermined digital value.

Further, while the ADC active signal ADC_Active is at a high level, the touch driving signal TDS may be generated using the second PWM signal $2^{nd}$ PWM and be output to a second touch electrode TE column. After a falling edge of the last pulse of the second PWM signal $2^{nd}$ PWM, the sample and hold circuit SHA of the second sensing unit 141-2 may be driven to sample and hold the integral value INT_TSS of the touch sensing signal. While the ADC active signal ADC_Active is at a high level, the analog to digital converter (ADC) 141-4 may receive the integral value INT_TSS of the analog touch sensing signal to convert the integral value into the digital sensing data SD.

Further, while the ADC active signal ADC_Active is at a high level, the touch driving signal TDS may be generated using the third PWM signal $3^{rd}$ PWM and be output to a third touch electrode TE column. After a falling edge of the last pulse of the third PWM signal $3^{rd}$ PWM, the sample and hold circuit SHA of the third sensing unit 141-2 may be driven to sample and hold the integral value INT_TSS of the touch sensing signal. While the ADC active signal ADC_Active is at a high level, the analog to digital converter (ADC) 141-4 may receive the integral value INT_TSS of the analog touch sensing signal to convert the integral value into the digital sensing data SD.

However, after outputting the third PWM signal $3^{rd}$ PWM, while the ADC active signal ADC_Active is at a high level, the synchronization signal Tsync may rise to a high level to switch from the touch sensing mode to the display mode. Therefore, during the period in which both the ADC active signal ADC_Active and the synchronization signal Tsync are at high levels, the comparator 145-1 may generate a high level overlap signal OS. The PWM controller 145-2 applied with the high level overlap signal OS may remove the last pulse of the third PWM signal $3^{rd}$ PWM of a subsequent frame.

Therefore, as illustrated in FIG. 7B, during the second frame period $2^{nd}$ Frame, the first PWM signal $1^{st}$ PWM and the second PWM signal $2^{nd}$ PWM may be output with the same number of pulses (e.g., eight pulses) as the first frame period $1^{st}$ Frame. However, in a $3^{rd}$ PWM, the number of pulses may be reduced, e.g., from eight pulses to seven pulses. The PWM signal PWM including eight pulses is merely an example, and a different number of pulses may be implemented in the PWM signals. For example, the PWM signals may have N pulses where N is a natural number of 1 or larger. In this case, the number of the pulses of the $3^{rd}$ PWM may be reduced to be smaller than N. For example, the number of pulses of the $3^{rd}$ PWM may be N−1.

Further, during the second frame period $2^{nd}$ Frame, the touch driving signal TDS may be generated using the third PWM signal $3^{rd}$ PWM and be output to a third touch electrode TE column. After a falling edge of the last pulse of the third PWM signal $3^{rd}$ PWM, the sample and hold circuit SHA of the third sensing unit 141-2 may be driven to sample and hold the integral value INT_TSS of the touch sensing signal. While the ADC active signal ADC_Active is at a high level, the analog to digital converter (ADC) 141-4 may receive the integral value INT_TSS of the analog touch sensing signal to convert the integral value into the digital sensing data SD.

However, after outputting the third PWM signal $3^{rd}$ PWM, while the ADC active signal ADC_Active is at a high level, the synchronization signal Tsync may rise to a high level to switch from the touch sensing mode to the display mode. Therefore, while both the ADC active signal ADC_Active and the synchronization signal Tsync are at high levels, the comparator 145-1 may generate a high level overlap signal OS. The PWM controller 145-2 which is applied with the high level overlap signal OS may remove the last pulse of the third PWM signal $3^{rd}$ PWM of a subsequent frame (illustrated in FIG. 7C) or remove a last pulse of the second PWM signal $2^{nd}$ PWM of a subsequent frame (illustrated in FIG. 7D).

That is, the number of pulses in the third PWM signal $3^{rd}$ PWM of the subsequent frame may be N−2 (as illustrated in FIG. 7C) or the number of pulses in the second PWM signal $2^{nd}$ PWM of the subsequent frame may be N−1 (as illustrated in FIG. 7D).

Accordingly, as illustrated in FIG. 7C, during the third frame period $3^{rd}$ Frame, the first PWM signal $1^{st}$ PWM and the second PWM signal $2^{nd}$ PWM may be output with eight pulses as in the first frame period 1st Frame and the second frame period 2nd Frame. In the third frame period 3rd Frame, the number of pulses of the third PWM signal $3^{rd}$ PWM may be further reduced from seven to six.

Alternatively, as illustrated in FIG. 7D, during the third frame period 3rd Frame, the first PWM signal $1^{st}$ PWM may be output with eight pulses as in the first frame period $1^{st}$ Frame and the second frame period $2^{nd}$ Frame. The third PWM signal $3^{rd}$ PWM may be output with seven pulses as in the second frame period $2^{nd}$ Frame. In the third frame period $3^{rd}$ Frame, the number of pulses of the second PWM signal $2^{nd}$ PWM may be reduced from eight to seven.

Further, in the third frame period $3^{rd}$ Frame, the touch driving signal TDS may be generated using the third PWM signal $3^{rd}$ PWM and be output to a third touch electrode TE column. After a falling edge of the last pulse of the third PWM signal $3^{rd}$ PWM, the sample and hold circuit SHA of the third sensing unit 141-2 may be driven to sample and hold the integral value INT_TSS of the touch sensing signal. While the ADC active signal ADC_Active is at a high level, the analog to digital converter ADC 141-4 may receive the integral value INT_TSS of the analog touch sensing signal to convert the integral value into the digital sensing data SD.

As illustrated in FIGS. 7C and 7D, after the third PWM signal $3^{rd}$ PWM is output, the ADC active signal ADC_Active may fall to a low level before the synchronization signal Tsync rises to a high level. Therefore, there is no period in which both the ADC active signal ADC_Active and the synchronization signal Tsync are at high levels in the third frame period, and the comparator 145-1 generates a low level overlap signal OS. At this time, the PWM controller 145-2 may be applied with a low level overlap signal OS so that the number of pulses in the PWM signals PWM of the subsequent frame is not further reduced.

As described above, the PWM modulator 145 of the touch display device according to an example embodiment of the present disclosure may sequentially advance the period in which the analog to digital converter operates by adjusting the number of pulses in the PWM signal. By doing this, the operation of the analog to digital converter may be completed within the touch sensing period of the touch display device according to an example embodiment of the present disclosure. As a result, in the touch display device according to an example embodiment of the present disclosure, jitter in the digitally converted sensing data due to the source channel toggle for the display driving may be prevented or reduced so that the touch sensing performance may be improved.

Hereinafter, a touch display device according to another example embodiment (a second example embodiment) of the present disclosure will be described. A touch display device according to another example embodiment (a second example embodiment) of the present disclosure is the same as the touch display device according to the above example embodiment of the present disclosure except that a compensator configured to compensate for sensing data is added. Hereinafter, a compensator of a touch display device according to another example embodiment (a second example embodiment) of the present disclosure will be described in more detail.

Figure 8:
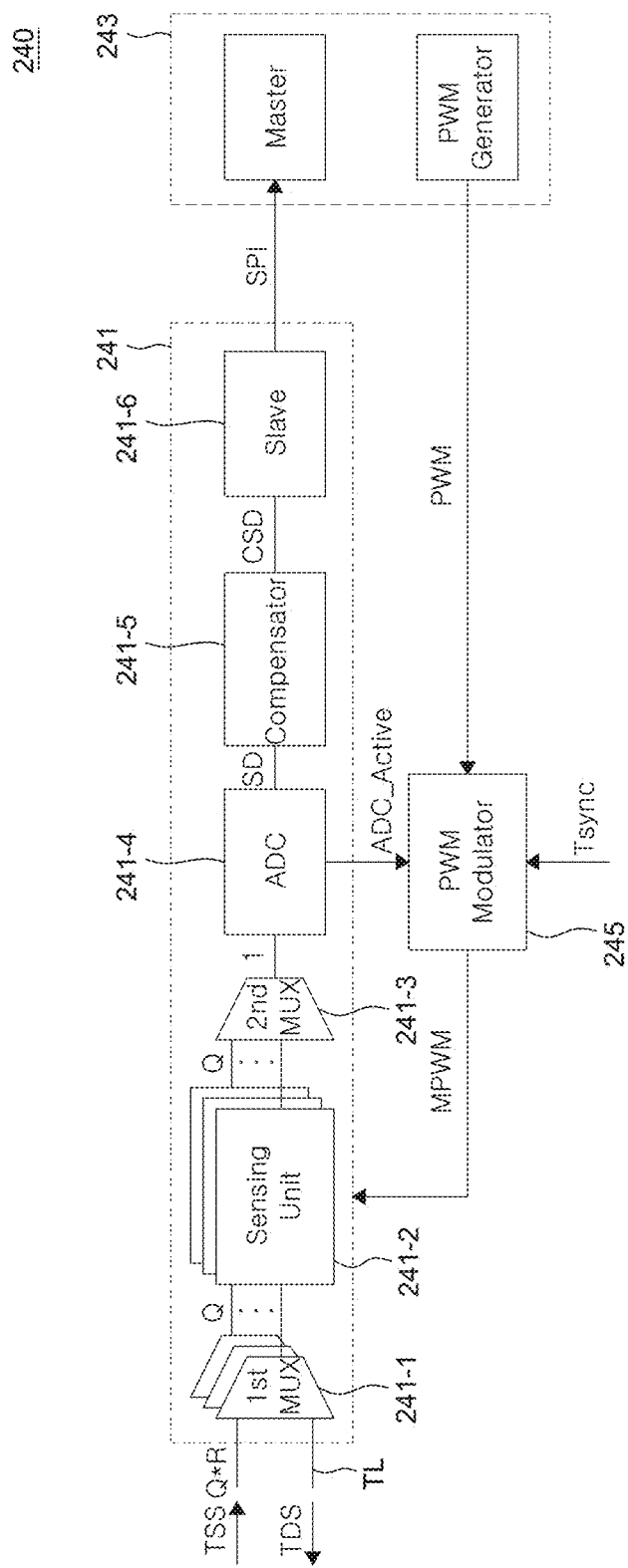
FIG. 8 is a diagram for explaining a touch driver of a touch display device according to another example embodiment (a second example embodiment) of the present disclosure.

FIG. 8 is a diagram for explaining a touch driver of a touch display device according to another example embodiment (a second example embodiment) of the present disclosure.

In the touch display device according to another example embodiment (a second example embodiment) of the present disclosure, a touch driver 240 may include a touch sensing circuit 241, a touch control circuit 243, and a PWM modulator 245.

The touch control circuit 243 and the PWM modulator 245 may be the same as the touch control circuit 143 and the PWM modulator 145 of the touch display device according to the above example embodiment of the present disclosure (e.g., as illustrated in FIG. 4). Thus, a redundant description may be omitted.

The touch sensing circuit 241 may detect a touch sensing signal TSS, which may vary depending on whether there is a touch, by driving the touch panel 113.

Specifically, the touch sensing circuit 241 may output a touch driving signal TDS to two or more touch electrodes TE and convert an analog touch sensing signal TSS detected by the touch electrodes TE applied with the touch driving signal TDS into digital sensing data SD to transmit the converted digital sensing data to the touch control circuit 243.

That is, the touch sensing circuit 241 may perform analog to digital conversion to convert the analog touch sensing signal TSS detected by each touch electrode TE applied with the touch driving signal TDS into digital sensing data SD.

The touch sensing circuit 241 in the touch display device according to another example embodiment (a second example embodiment) of the present disclosure may compensate for sensing data corresponding to a pulse removed from the PWM signal PWM to form the modified PWM signal MPWM in the PWM modulator 245.

Specifically, as illustrated in FIG. 8, the touch sensing circuit 241 may include a plurality of first multiplexers 241-1, a plurality of sensing units 241-2, a second multiplexer 241-3, an analog to digital converter ADC 241-4, a data compensator 241-5, and a slave processor 241-6.

Each of the plurality of first multiplexers 241-1 may select one touch sensing signal TSS among a plurality of touch sensing signals TSS output from one column of touch electrodes TE. Specifically, each of the plurality of first multiplexers 241-1 may be connected to a plurality of touch lines TL connected to one column of touch electrodes TE and perform a R:1 multiplexing. For example, Q first multiplexers 241-1 may select Q touch sensing signals TSS among touch sensing signals TSS received from the plurality of touch electrodes TE disposed in the Q×R matrix.

The plurality of sensing units 241-2 may integrate a plurality of touch sensing signals TSS, respectively, and each sample an integral value INT_TSS of the corresponding touch sensing signal. Each of the plurality of sensing units 241-2 may output the touch driving signal TDS to the corresponding touch electrode or electrodes TE of the touch panel 113.

Further, each of the plurality of sensing units 241-2 may be connected to a respective one of the plurality of first multiplexers 241-1 one-to-one to integrate the corresponding touch sensing signal TSS selected by the corresponding first multiplexer 241-1 or output the touch driving signal TDS through the corresponding first multiplexer 241-1.

For example, Q sensing units 241-2 may be connected to Q first multiplexers 241-1, respectively, on a one-to-one basis.

The second multiplexer 241-3 may select one touch sensing signal TSS among a plurality of touch sensing signals TSS output from the plurality of sensing units 241-2. Specifically, the second multiplexer 241-3 may be a circuit which is connected to the plurality of sensing units 241-2 and performs a Q:1 multiplexing. For example, the second multiplexer 241-3 may select one of Q sensing units 241-2 to input a voltage held in the sample and hold circuit SHA of the selected sensing unit 241-2 to the analog to digital converter (ADC) 241-4.

The analog to digital converter (ADC) 241-4 may convert the input voltage into digital sensing data SD to output the converted digital sensing data SD.

Further, during the period in which the analog to digital converter ADC 241-4 operates, the analog to digital converter ADC 241-4 may output a high level ADC active signal ADC_Active to the PWM modulator 245.

Figure 9:
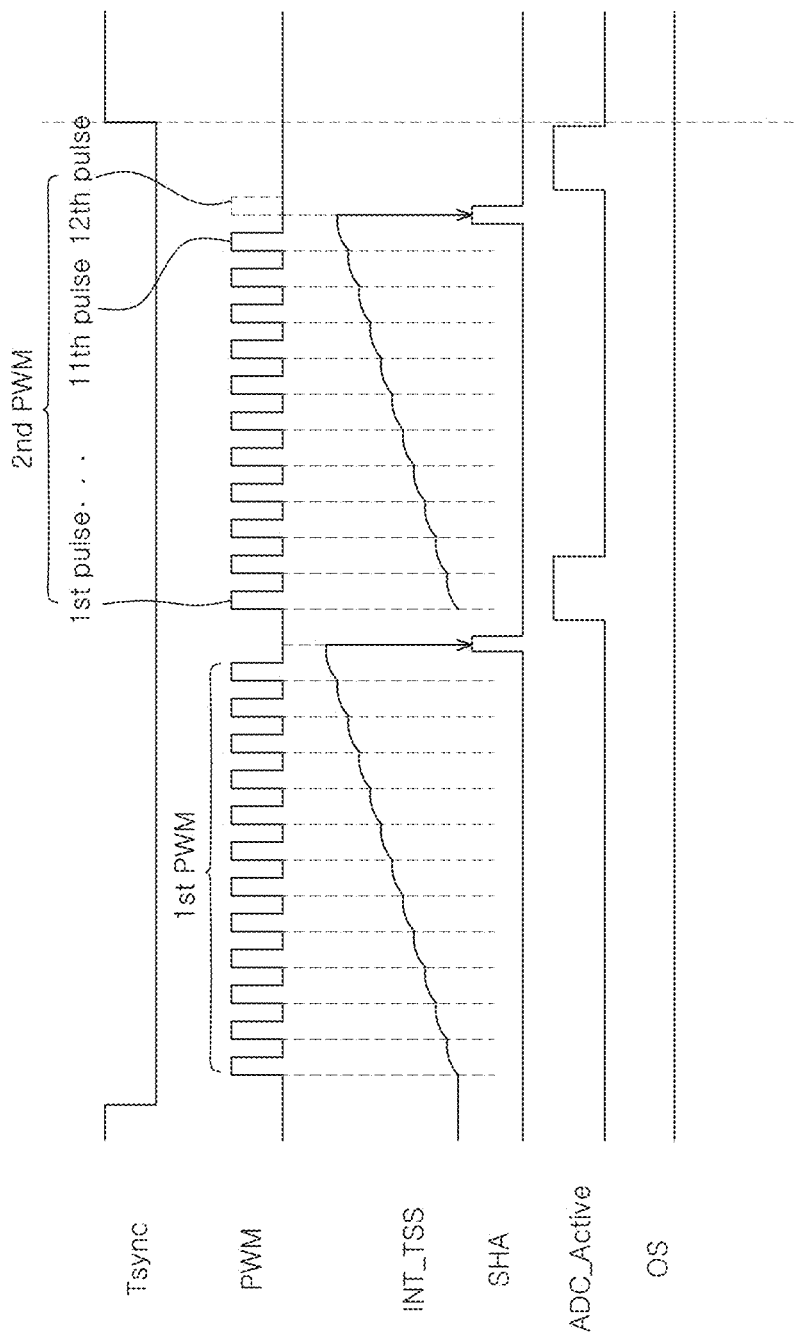
FIG. 9 is a diagram for explaining an operation of a data compensator of a touch display device according to another example embodiment (a second example embodiment) of the present disclosure.

FIG. 9 is a diagram for explaining an operation of a data compensator of a touch display device according to another example embodiment (a second example embodiment) of the present disclosure.

The data compensator 241-5 may compensate for the converted digital sensing data SD to generate digital compensated sensing data CSD.

As described above, the PWM modulator 245 may remove one or more of the pulses in the PWM signal PWM depending on whether the ADC active signal ADC_Active and the synchronization signal Tsync overlap. That is, as illustrated in FIG. 9, a twelfth pulse which (in this example) is the last pulse of the second PWM signal $2^{nd}$ PWM may be removed.

Therefore, after calculating sensing data corresponding to the number of removed pulses, the data compensator 241-5 may add digital sensing data SD input from the analog to digital converter ADC 241-4 to generate digital compensated sensing data CSD.

For example, if sensing data SD corresponding to a first pulse to an eleventh pulse of the second PWM signal $2^{nd}$ PWM is 1100, an average sensing data for one pulse of the second PWM signal $2^{nd}$ PWM may be set to 100. That is, the sensing data corresponding to the removed twelfth pulse may be set to 100.

Therefore, the data compensator 241-5 may add 100 (which is the sensing data corresponding to the removed twelfth pulse) to 1100 (which is the sensing data SD corresponding to the first pulse to the eleventh pulse) to generate the compensated sensing data CSD.

The output digital compensated sensing data CSD may be transmitted to the touch control circuit 243 via the slave processor 241-6 of the touch sensing circuit 241.

In the touch display device according to another example embodiment (a second example embodiment) of the present disclosure, sensing data corresponding to the removed pulse of the PWM signal may be added to the sensing data to compensate for the digital sensing data.

Therefore, in the touch display device according to another example embodiment (a second example embodiment) of the present disclosure, jitter may be prevented or reduced in the sensing data. Further, even though the PWM signal may be partially removed, the sensing data may not be damaged.

As a result, the touch display device according to another example embodiment (second example embodiment) of the present disclosure may more accurately perform the touch sensing.

Hereinafter, a driving method of a touch display device according to an example embodiment of the present disclosure will be described. The driving method of a touch display device according to an example embodiment of the present disclosure will be described based on the above-described touch display device according to an example embodiment of the present disclosure.

Figure 10:
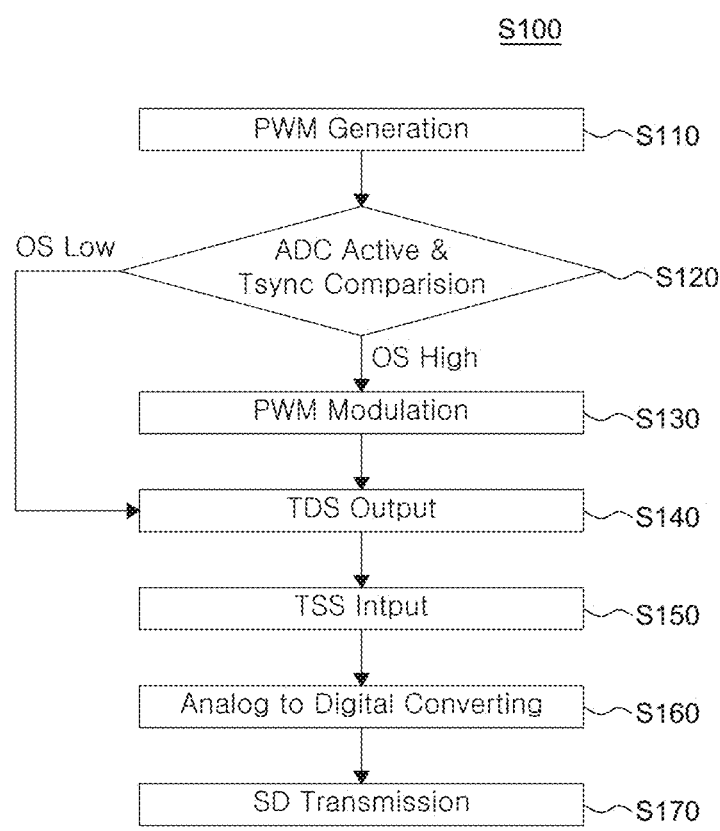
FIG. 10 is a flowchart for explaining a driving method of a touch display device according to an example embodiment of the present disclosure.

FIG. 10 is a flowchart for explaining a driving method of a touch display device according to an example embodiment of the present disclosure.

A driving method S100 of the touch display device according to an example embodiment of the present disclosure may include a PWM generating step (PWM Generation) S110, a signal comparing step (ADC_Active & Tsync Comparison) S120, a PWM modulating step (PWM Modulation) S130, a touch driving signal output step (TDS Output) S140, a touch sensing signal input step (TSS Input) S150, an analog to digital converting step (Analog to Digital Converting) S160, and a sensing data transmitting step (SD transmission) S170.

In the PWM generating step (PWM Generation) S110, a PWM signal including a plurality of pulses may be generated.

Specifically, in the PWM generating step (PWM Generation) S110, a plurality of PWM signals including a plurality of pulses may be generated. For example, as illustrated in FIGS. 7A to 7D, a first PWM signal $1^{st}$ PWM, a second PWM signal $2^{nd}$ PWM, and a third PWM signal $3^{rd}$ PWM may be output.

In the signal comparing step (ADC_Active & Tsync Comparison) S120, the ADC active signal ADC_Active and the synchronization signal Tsync may be compared to determine whether the ADC active signal ADC_Active and the synchronization signal Tsync overlap.

In the signal comparing step (ADC_Active & Tsync Comparison) S120, as illustrated in FIGS. 7A and 7B, when both the ADC active signal ADC_Active and the synchronization signal Tsync are at high levels, a high level overlap signal OS may be generated. In this case, after performing the PWM modulating step (PWM Modulation) S130, the touch driving signal output step (TDS Output) S140 may be performed.

As illustrated in FIGS. 7C and 7D, when any one of the ADC active signal ADC_Active and the synchronization signal Tsync is at a low level, a low level overlap signal OS may be generated. In this case, the touch driving signal output step (TDS Output) S140 may be performed without performing the PWM modulating step (PWM Modulation) S130.

In the PWM modulating step (PWM Modulation) S130, if the overlap signal OS is at a high level, at least one of the plurality of pulses in the PWM signal PWM may be removed. Specifically, if the overlap signal OS is at a high level in the PWM modulating step (PWM Modulation) S130, a last pulse among the plurality of pulses in the PWM signal PWM may be sequentially removed.

For example, as illustrated in FIGS. 7A and 7B, if the overlap signal OS is at a high level in the first frame period $1^{st}$ Frame, the last pulse of the third PWM signal $3^{rd}$ PWM in the second frame period $2^{nd}$ Frame may be removed.

As another example, as illustrated in FIGS. 7B and 7C, if the overlap signal OS is at a high level in the second frame period $2^{nd}$ Frame, the last pulse of the third PWM signal $3^{rd}$ PWM in the third frame period $3^{rd}$ Frame may be removed.

As another example, as illustrated in FIGS. 7B and 7D, if the overlap signal OS is at a high level in the second frame period $2^{nd}$ Frame, the last pulse of the second PWM signal $2^{nd}$ PWM in the third frame period $3^{rd}$ Frame may be removed.

That is, in the PWM modulating step (PWM Modulation) S130, at least one of the plurality of pulses in the PWM signals PWM may be removed to generate a modified PWM signal MPWM.

In the touch driving signal output step (TDS Output) S140, the modified PWM signal MPWM or the PWM signal PWM may be output to the touch electrode(s) TE of the touch panel 113 as a touch driving signal TDS.

Specifically, if the overlap signal OS is at a high level, in the PWM modulating step (PWM Modulation) S130, at least one pulse of the plurality of pulses of the PWM signals PWM may be removed to generate a modified PWM signal MPWM. Further, in the touch driving signal output step (TDS Output) S140, the modified PWM signal MPWM may be output to each of the plurality of touch electrodes TE as a touch driving signal TDS.

In contrast, if the overlap signal OS is at a low level, the PWM modulating step (PWM Modulation) S130 is not performed, and in the touch driving signal output step (TDS Output) S140, the PWM signal PWM with no pulse removed may be output to each of the plurality of touch electrodes TE as a touch driving signal TDS.

In the touch sensing signal input step (TSS Input) S150, the touch sensing circuit 141 may receive an analog touch sensing signal TSS from each touch electrode TE applied with the touch driving signal TDS. In the touch sensing signal input step (TSS Input) S150, the plurality of touch sensing signals TSS may be integrated, and the integral value INT_TSS of the touch sensing signal may be sampled and held.

In the analog to digital converting step S160, the integral value INT_TSS of the analog touch sensing signal may be input to be converted into the digital sensing data SD.

In the sensing data transmitting step (SD Transmission) S170, the digital sensing data SD may be transmitted to determine touch information about the presence of touch and a touch position based on the digital sensing data.

The sensing data SD transmission may be implemented with a master-slave architecture, and the data may be transmitted and received via the communication interface I/F. The above-described communication interface I/F may be a serial peripheral interface SPI.

As described above, in the PWM modulating step (PWM Modulation) S130 of the driving method of the touch display device according to an example embodiment of the present disclosure, the number of pulses in the PWM signal may be reduced depending on whether the ADC active signal ADC_Active and the synchronization signal Tsync overlap. By doing this, the timing of performing the analog to digital converting step S160 may be advanced. Therefore, in the driving method of the touch display device according to an example embodiment of the present disclosure, the analog to digital converting step S160 may be completed within the touch sensing period. As a result, in the driving method of the touch display device according to an example embodiment of the present disclosure, jitter in the digitally converted sensing data SD due to the source channel toggle for the display driving may be prevented or reduced so that the touch sensing performance may be improved.

Hereinafter, a driving method of a touch display device according to another example embodiment (a second example embodiment) of the present disclosure will be described. A driving method of a touch display device according to another example embodiment (a second example embodiment) of the present disclosure may be the same as the driving method of a touch display device according to the above example embodiment of the present disclosure (see, e.g., FIG. 10) except a sensing data compensating step and a compensated sensing data transmitting step. Hereinafter, the sensing data compensating step and the compensated sensing data transmitting step of the driving method of a touch display device according to another example embodiment (a second example embodiment) of the present disclosure will be described in more detail.

Figure 11:
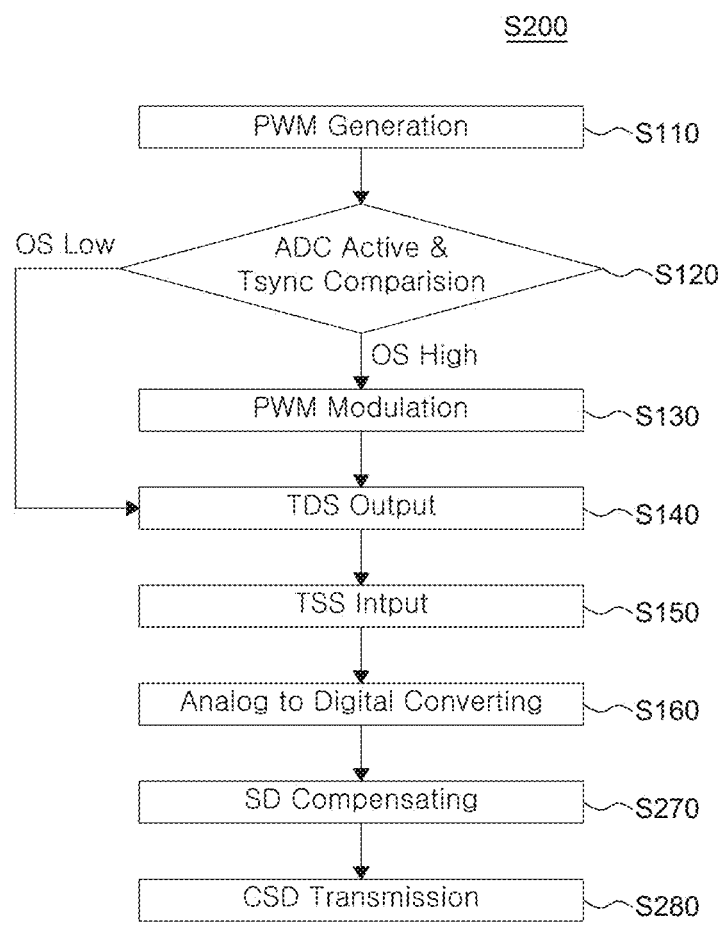
FIG. 11 is a flowchart for explaining a driving method of a touch display device according to another example embodiment (a second example embodiment) of the present disclosure.

FIG. 11 is a flowchart for explaining a driving method of a touch display device according to another example embodiment (a second example embodiment) of the present disclosure.

A driving method S200 of the touch display device according to another example embodiment (a second example embodiment) may include a PWM generating step (PWM Generation) S110, a signal comparing step (ADC_Active & Tsync Comparison) S120, a PWM modulating step (PWM Modulation) S130, a touch driving signal output step (TDS Output) S140, a touch sensing signal input step (TSS Input) S150, an analog to digital converting step (Analog to Digital Converting) S160, a sensing data compensating step (SD compensating) S270, and a compensated sensing data transmitting step (CSD transmission) S280.

The PWM generating step (PWM Generation) S110, the signal comparing step (ADC_Active & Tsync Comparison) S120, the PWM modulating step (PWM Modulation) S130, the touch driving signal output step (TDS Output) S140, the touch sensing signal input step (TSS Input) S150, and the analog to digital converting step (Analog to Digital Converting) S160 of the driving method S200 of the touch display device according to another example embodiment (a second example embodiment) may be the same as those of the driving method S100 of the touch display device according to an example embodiment of the present disclosure. Therefore, a redundant description these steps may be omitted.

In the sensing data compensating step (SD Compensating) S270, the digital sensing data SD converted in the analog to digital converting step S160 may be compensated to generate digital compensated sensing data CSD.

As described above, in the PWM modulating step (PWM Modulation) S130, one or more of the pulses of the PWM signals PWM may be removed depending on whether the ADC active signal ADC_Active and the synchronization signal Tsync overlap. That is, as illustrated in FIG. 9, a twelfth pulse which (in this example) is the last pulse of the second PWM signal $2^{nd}$ PWM may be removed.

Therefore, in the sensing data compensating step (SD Compensating) S270, after calculating sensing data corresponding to the number of removed pulses, that calculated sensing data may be added to the digital sensing data SD converted in the analog to digital converting step S160 to generate digital compensated sensing data CSD.

For example, if sensing data SD corresponding to a first pulse to an eleventh pulse of the second PWM signal $2^{nd}$ PWM is 1100, an average sensing data for one pulse of the second PWM signal $2^{nd}$ PWM may be set to 100. That is, the sensing data corresponding to the removed twelfth pulse may be set to 100.

Therefore, in the sensing data compensating step (SD Compensating) S270, 100 (which is the sensing data corresponding to the removed twelfth pulse) may be added to 1100 (which is the sensing data SD corresponding to the first pulse to the eleventh pulse) to generate the compensated sensing data CSD.

In the compensated sensing data transmitting step (CSD Transmission) S280, the digital compensated sensing data CSD may be transmitted to determine touch information about the presence of touch and a touch position based on the compensated sensing data CSD.

In the driving method of the touch display device according to another example embodiment (a second example embodiment) of the present disclosure, the sensing data corresponding to the removed pulse of the PWM signal may be added to the sensing data SD to compensate for the digital sensing data.

Therefore, in the driving method of the touch display device according to another example embodiment (a second example embodiment) of the present disclosure, jitter may be prevented or reduced in the sensing data. Further, even though the PWM signal may be partially removed, the sensing data may not be damaged.

As a result, the driving method of the touch display device according to another example embodiment (second example embodiment) of the present disclosure allows the touch sensing to be more accurately performed.

Hereinafter, a touch display device according to still another example embodiment (a third example embodiment) of the present disclosure will be described. A difference between the touch display device according to the above example embodiment of the present disclosure (see, e.g., FIG. 4) and a touch display device according to still another example (a third example embodiment) of the present disclosure is in the manner in which a sampling timing of a sample and hold circuit SHA may be controlled. Hereinafter, sampling timing control of a sample and hold circuit SHA of a touch display device according to still another example embodiment (a third example embodiment) of the present disclosure will be described in more detail.

Figure 12:
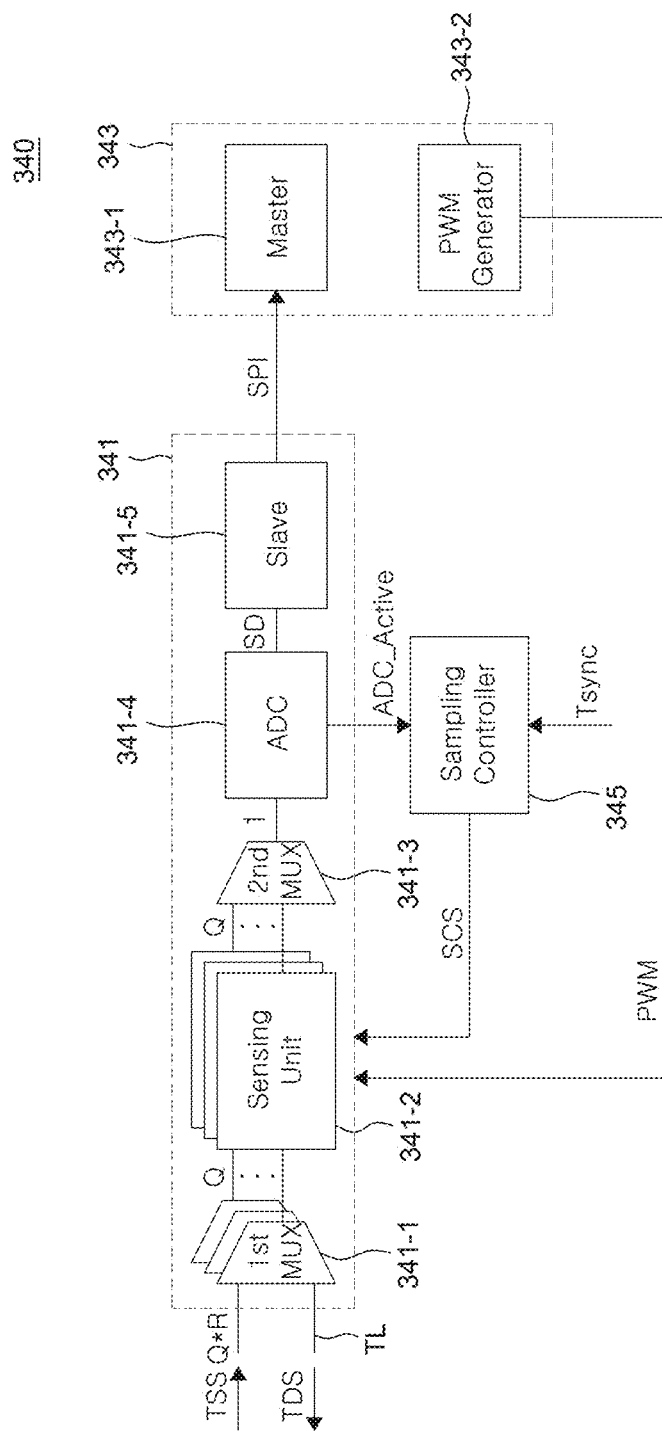
FIG. 12 is a diagram for explaining a touch driver of a touch display device according to still another example embodiment (a third example embodiment) of the present disclosure.

FIG. 12 is a diagram for explaining a touch driver of a touch display device according to still another example embodiment (a third example embodiment) of the present disclosure.

Figure 13:
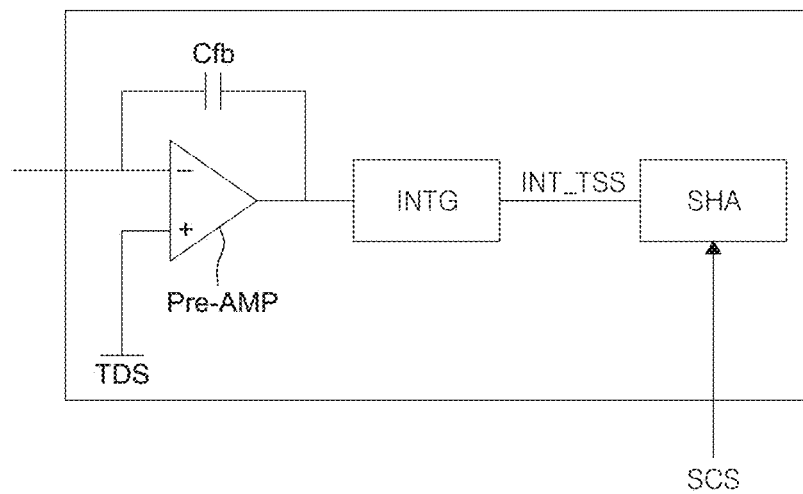
FIG. 13 is a diagram for explaining a sensing unit of a touch display device according to still another example embodiment (a third example embodiment) of the present disclosure.

FIG. 13 is a diagram for explaining a sensing unit of a touch display device according to still another example embodiment (a third example embodiment) of the present disclosure.

In the touch display device according to still another example embodiment (a third example embodiment) of the present disclosure, a touch driver 340 may include a touch sensing circuit 341, a touch control circuit 343, and a sampling control circuit 345. The touch sensing circuit 341 may be disposed in the form of an integrated circuit IC, and the touch control circuit 343 may be disposed in the form of a micro control unit MCU.

The touch sensing circuit 341 may detect a touch sensing signal TSS, which may vary depending on whether there is a touch, by driving the touch panel 113.

Specifically, the touch sensing circuit 341 may output a touch driving signal TDS to two or more touch electrodes TE and may convert an analog touch sensing signal TSS detected by the touch electrodes TE applied with the touch driving signal TDS into digital sensing data SD to transmit the converted digital sensing data to the touch control circuit 343.

That is, the touch sensing circuit 341 may perform analog to digital conversion to convert the analog touch sensing signal TSS detected by each touch electrode TE applied with the touch driving signal TDS into digital sensing data SD.

Specifically, as illustrated in FIG. 12, the touch sensing circuit 341 may include a plurality of first multiplexers 341-1, a plurality of sensing units 341-2, a second multiplexer 341-3, an analog to digital converter ADC 341-4, and a slave processor 341-5.

Each of the plurality of first multiplexers 341-1 may select one touch sensing signal TSS among a plurality of touch sensing signals TSS output from one column of touch electrodes TE. Specifically, each of the plurality of first multiplexers 341-1 may be connected to a plurality of touch lines TL connected to one column of touch electrodes TE and perform a R:1 multiplexing. For example, Q first multiplexers 341-1 may select Q touch sensing signals TSS among touch sensing signals TSS received from the plurality of touch electrodes TE disposed in the Q×R matrix.

The Q first multiplexers may be Q MUXs connected to Q columns of touch electrodes TE illustrated in FIG. 2.

The plurality of sensing units 341-2 may integrate a plurality of touch sensing signals TSS, respectively, and each sample an integral value INT_TSS of the corresponding touch sensing signal. Each of the plurality of sensing units 341-2 may output the touch driving signal TDS to the corresponding touch electrode or electrodes TE of the touch panel 113.

Further, each of the plurality of sensing units 341-2 may be connected to a respective one of the plurality of first multiplexers 341-1 one-to-one to integrate the corresponding touch sensing signal TSS selected by the first multiplexer 341-1 or output the touch driving signal TDS through the first multiplexer 341-1.

For example, Q sensing units 341-2 may be connected to Q first multiplexers 341-1, respectively, on a one-to-one basis.

As shown in FIG. 13, each of the plurality of sensing units 341-2 may include a preamplifier Pre-AMP, an integrator INTG, and a sample and hold circuit SHA.

The preamplifier Pre-AMP may store a charge corresponding to a capacitance formed between the touch electrode TE and a touched object. Specifically, a charge corresponding to a capacitance formed between the touch electrode TE and a touched object may be stored in a feedback capacitor Cfb of the preamplifier Pre-AMP.

The preamplifier Pre-AMP may output the input touch driving signal TDS to the touch electrode TE through the first multiplexer 141-1.

The integrator INTG may output an integral value INT_TSS of the touch sensing signal which is an output voltage of the preamplifier Pre-AMP. Such an integrator INTG may be configured by elements such as a comparator or a capacitor. A signal output from the integrator INTG may be input to the sample and hold circuit SHA.

The sample and hold circuit SHA may be a circuit configured to sample and hold the integral value INT_TSS of the touch sensing signal and to hold the integral value INT_TSS of the touch sensing signal until the analog to digital converter (ADC) 341-4 ends a previous conversion.

In the touch display device according to still another example embodiment (a third example embodiment) of the present disclosure, the sampling timing of the sample and hold circuit SHA may be controlled by a sampling control signal SCS output from the sampling control circuit 345.

As shown in FIG. 12, the second multiplexer 341-3 may select one touch sensing signal TSS among a plurality of touch sensing signals TSS output from the plurality of sensing units 341-2. Specifically, the second multiplexer 341-3 may be a circuit which is connected to the plurality of sensing units 341-2 and performs a Q:1 multiplexing. For example, the second multiplexer 341-3 may select one of Q sensing units 341-2 to input a voltage held in the sample and hold circuit SHA of the selected sensing unit 341-2 to the analog to digital converter (ADC) 341-4.

The analog to digital converter ADC 341-4 may convert the input voltage into digital sensing data SD to output the converted digital sensing data.

The output digital sensing data SD may be transmitted to the touch control circuit 343 via the slave processor 341-5 of the touch sensing circuit 341.

In the period in which the analog to digital converter ADC 141-4 converts the integral value INT_TSS of the touch sensing signal into digital sensing data SD, the analog to digital converter ADC 141-4 may output an ADC active signal ADC_Active to the PWM modulator 145. That is, during the period in which the analog to digital converter ADC 141-4 outputs the integral value INT_TSS of the touch sensing signal as digital sensing data SD, the ADC active signal ADC_Active may be at a high level.

In summary, during the touch driving operation, the analog to digital conversion, and the sensing data SD transmission, the touch sensing circuit 341 may perform the analog to digital conversion after performing the touch driving operation. Further, the touch sensing circuit 341 may sequentially (serially) perform the sensing data SD transmission after completing all the analog to digital conversion.

The touch control circuit 343 may generate a PWM signal PWM including a plurality of pulses and may receive the digital sensing data SD to determine touch information about the presence of touch and a touch position based on the digital sensing data SD.

The touch control circuit 343 may include a master processor 343-1 and a PWM generator 343-2.

The slave processor 341-5 of the touch sensing circuit 341 and the master processor 343-1 of the touch control circuit 343 may form a master-slave architecture, and transmit and receive data therebetween via a communication interface I/F.

The communication interface I/F between the touch sensing circuit 341 and the touch control circuit 343 may be a serial peripheral interface SPI.

The serial peripheral interface SPI may be an interface operating in a full duplex mode which is a synchronous serial data connection scheme and is a communication scheme in which the touch sensing circuit 341 and the touch control circuit 343 may simultaneously use independent lines to transmit and receive data.

The PWM generator 343-2 may provide the PWM signal PWM including a plurality of pulses to each of the plurality of sensing units 341-2. Specifically, the PWM generator 343-2 may supply the PWM signal PWM including a plurality of pulses to the plurality of sensing units 341-2 only during the touch sensing period.

Figure 14:
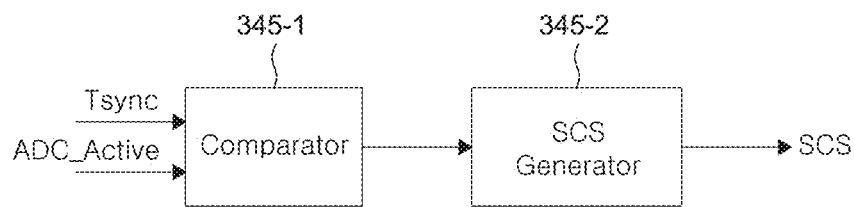
FIG. 14 is a diagram for explaining a sampling control circuit of a touch display device according to still another example embodiment (a third example embodiment) of the present disclosure.

FIG. 14 is a diagram for explaining a sampling control circuit of a touch display device according to still another example embodiment (a third example embodiment) of the present disclosure.

The sampling control circuit 345 may control a sampling timing of the sample and hold circuit SHA depending on whether the ADC active signal ADC_Active and the synchronization signal Tsync overlap. That is, the sampling control circuit 345 may generate a sampling control signal SCS to control the sampling timing of the sample and hold circuit SHA only when an operation period of the analog to digital converter ADC and the display period D overlap.

The sampling control circuit 345 may output the sampling control signal SCS to the plurality of sensing units 341-2.

Specifically, as illustrated in FIG. 14, the sampling control circuit 345 may include a comparator 345-1 and a sampling control signal generator (SCS generator) 345-2. The comparator 345-1 may compare the ADC active signal ADC_Active and the synchronization signal Tsync to determine whether these signals overlap. Based on this determination, the sampling control signal generator 345-2 may generate a sampling control signal SCS to control the sampling timing of the sample and hold circuit SHA.

The comparator 345-1 may be applied with the ADC active signal ADC_Active and the synchronization signal Tsync. When both the ADC active signal ADC_Active and the synchronization signal Tsync are at high levels, the comparator 345-1 may generate a high level overlap signal OS. When any one of the ADC active signal ADC_Active and the synchronization signal Tsync is at a low level, the comparator 345-1 may generate a low level overlap signal OS.

The above-described operation of the comparator 345-1 is based on an example implementation in which the synchronization signal Tsync is at a low level in a touch sensing period T and at a high level in a display period D.

However, the present disclosure is not limited to the above example implementation. For example, the synchronization signal Tsync may be at a high level in a touch sensing period T and at a low level in a display period D. In this alternative example, the operation of the comparator 345-1 may be as follows.

When the ADC active signal ADC_Active is at a high level and the synchronization signal Tsync is at a low level, the comparator 345-1 may generate a high level overlap signal OS. In contrast, when both the ADC active signal ADC_Active and the synchronization signal Tsync are at low levels, the comparator 345-1 may generate a low level overlap signal OS.

When the overlap signal OS is at a high level, the sampling control signal generator 345-2 may generate the sampling control signal SCS to control the sampling timing of the sample and hold circuit SHA. Specifically, when the overlap signal OS is at a high level, the sampling control signal generator 345-2 may generate a sampling control signal SCS to control the sample and hold circuit SHA to perform the sampling before the last pulse of the plurality of pulses of the PWM signal PWM is output.

Even though FIG. 12 illustrates that the sampling control circuit 345 is disposed separately from the touch sensing circuit 341 and the touch control circuit 343, the present disclosure is not limited thereto. For example, the sampling control circuit 345 may be included in an integrated circuit IC type touch sensing circuit 341 or a micro control unit MCU type touch control circuit 343.

Hereinafter, the sampling timing of the sample and hold circuit SHA based on the sampling control signal SCS in the touch display device according to another example embodiment (a third example embodiment) of the present disclosure will be described with reference to FIGS. 15A to 15D.

FIGS. 15A to 15D are graphs for explaining an operation of a PWM modulator of a touch display device according to still another example embodiment (a third example embodiment) of the present disclosure.

Figure 15A:
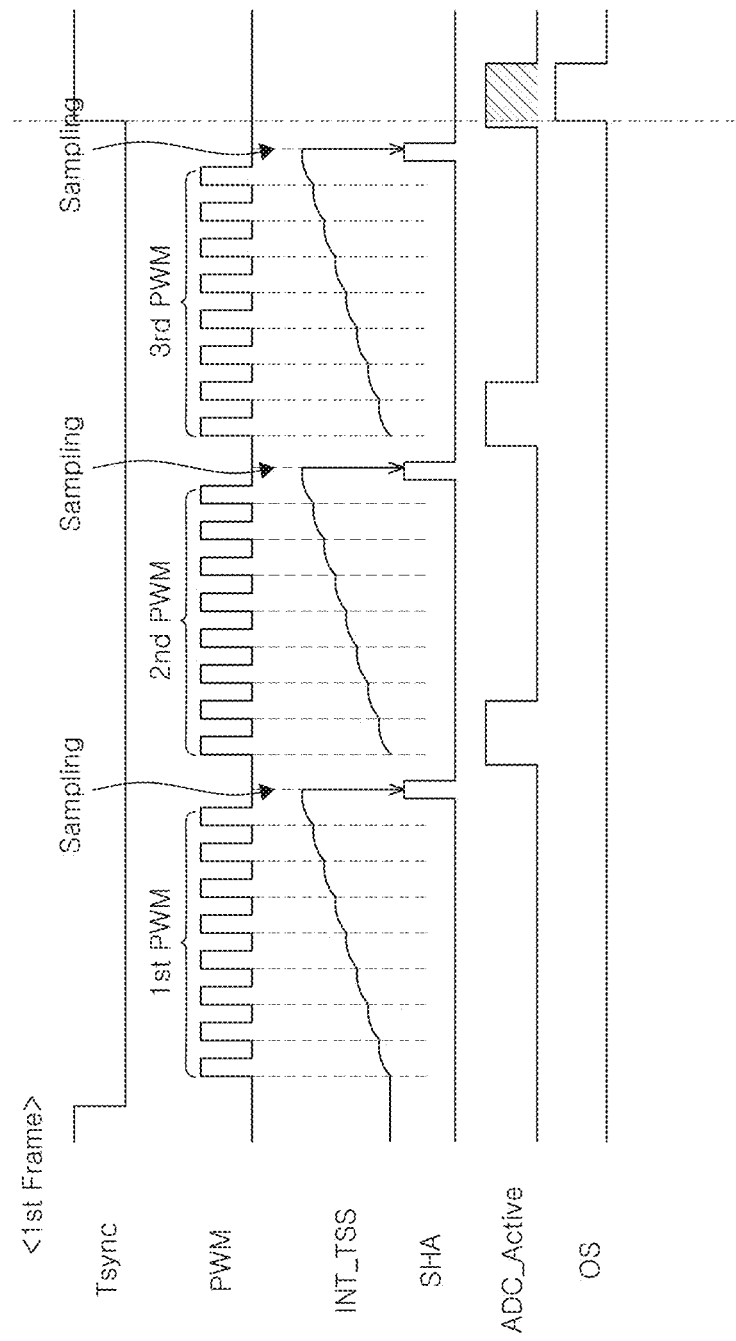
FIGS. 15A to 15D are timing diagrams for explaining an operation of a PWM modulator of a touch display device according to still another example embodiment (a third example embodiment) of the present disclosure.
Figure 15B:
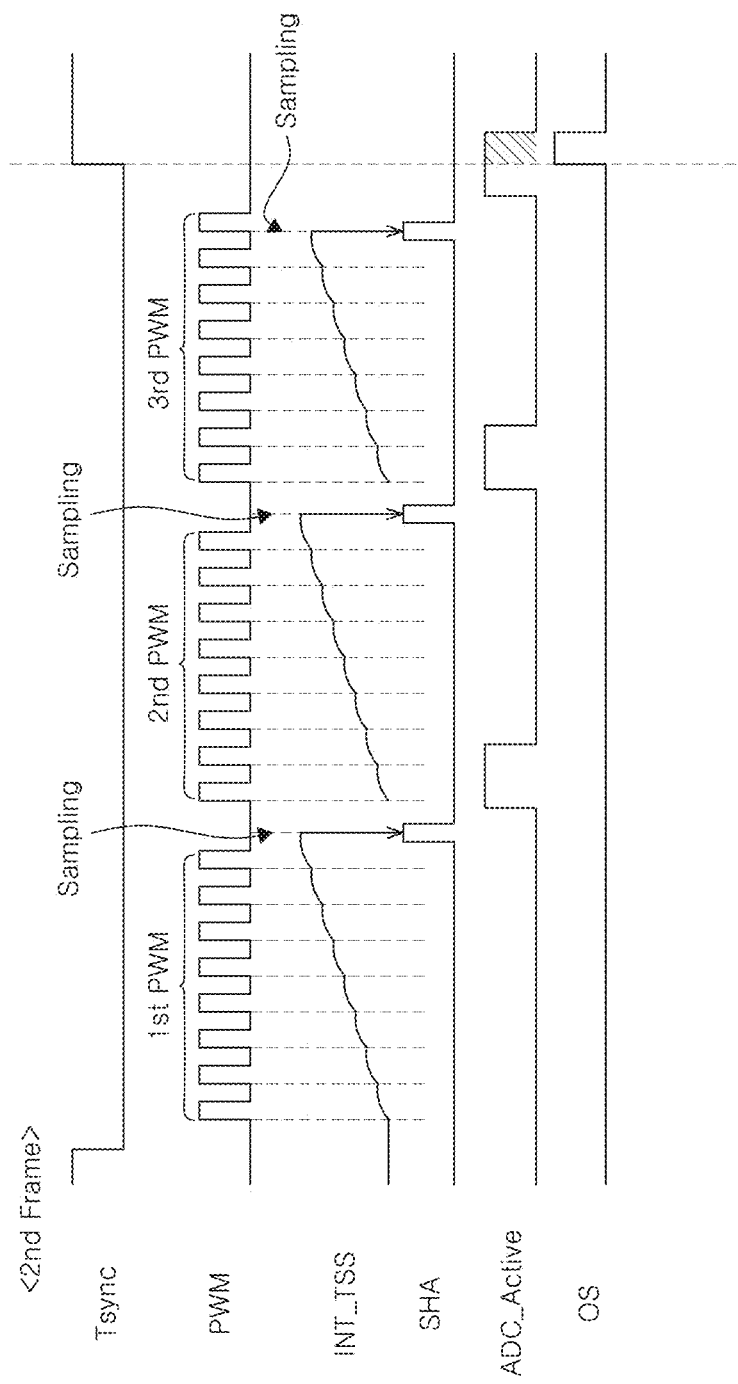
Figure 15C:
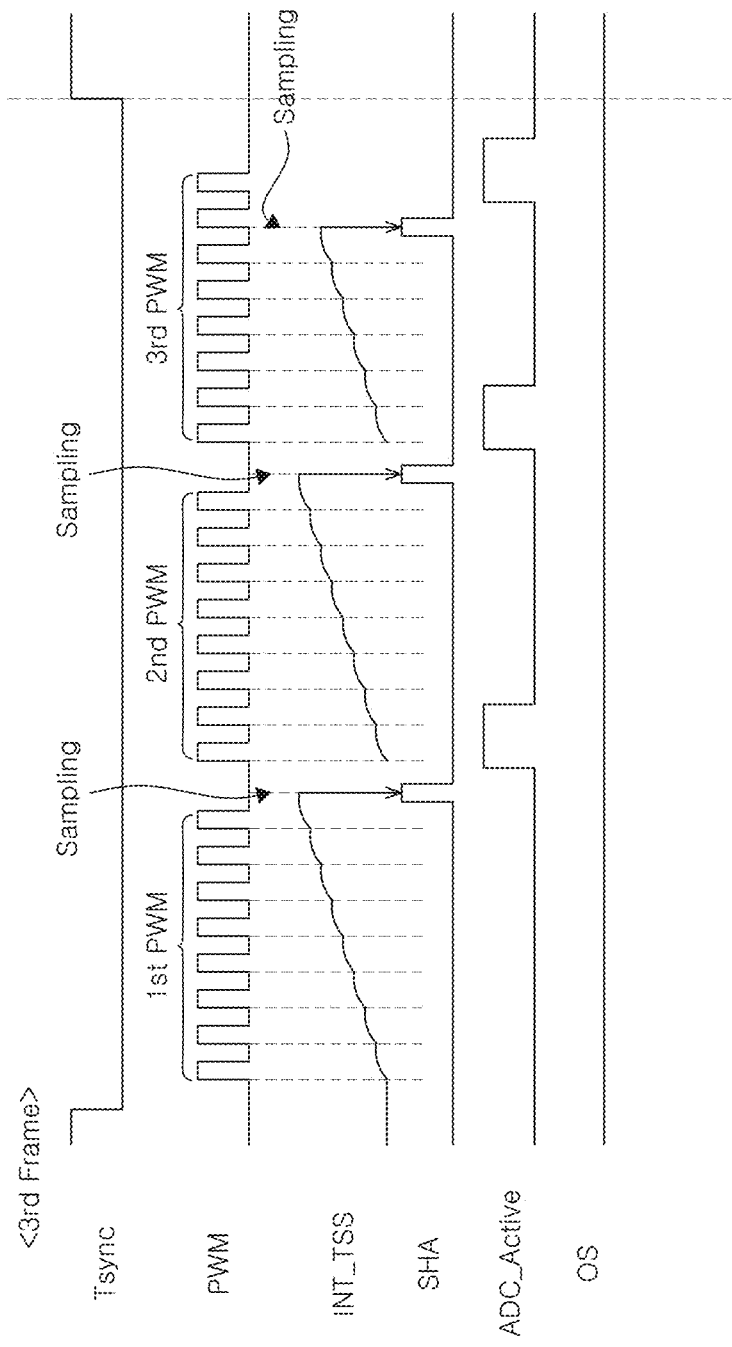
Figure 15D:
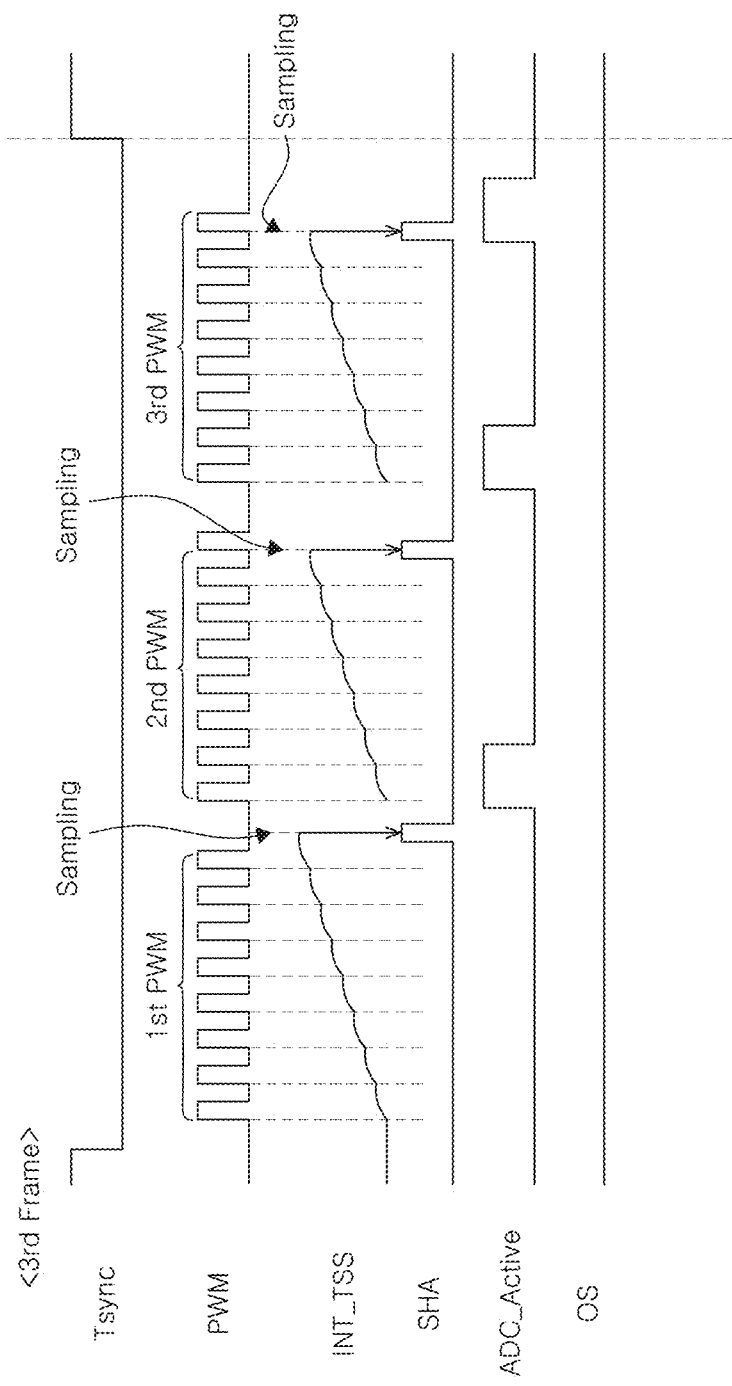

Specifically, FIG. 15A illustrates various signals for touch sensing in a touch sensing period of a first frame period $1^{st}$ Frame. FIG. 15B illustrates various signals for touch sensing in a touch sensing period of a second frame period $2^{nd}$ Frame. FIGS. 15C and 15D illustrate various signals for touch sensing in a touch sensing period of a third frame period $3^{rd}$ Frame.

As shown in FIG. 15A, during the touch sensing period of the first frame period $1^{st}$ Frame, the plurality of PWM signals PWM may be transmitted to the touch sensing circuit 341.

For example, three PWM signals PWM are illustrated. A first PWM signal $1^{st}$ PWM may be output to the touch electrode(s) TE via the first sensing unit 341-2 and a first one of the first multiplexers 341-1, as a touch driving signal TDS. A second PWM signal $2^{nd}$ PWM may be output to the touch electrode(s) TE via the second sensing unit 341-2 and a second one of the first multiplexers 341-1, as a touch driving signal TDS. A third PWM signal $3^{rd}$ PWM may be output to the touch electrode(s) TE via a third sensing unit 341-2 and a third one of the first multiplexers 341-1, as a touch driving signal TDS.

In the first frame period $1^{st}$ Frame, the synchronization signal Tsync may fall from a high level to a low level so that the operation mode of the touch display device 100 is changed from the display mode to the touch sensing mode.

In the above description, the operation is based on an example implementation that the synchronization signal Tsync is at a low level in a touch sensing period T and at a high level in a display period D. However, the present disclosure is not limited thereto. In another example, the synchronization signal Tsync may be at a high level in a touch sensing period T and at a low level in a display period D. In this alternative example, when the synchronization signal Tsync rises from a low level to a high level, the operation mode of the touch display device 100 may be changed from the display mode to the touch sensing mode.

Next, the touch driving signal TDS may be generated using the first PWM signal $1^{st}$ PWM and be output to a first touch electrode TE column. After a falling edge of the last pulse of the first PWM signal $1^{st}$ PWM, the sample and hold circuit SHA of the first sensing unit 341-2 may be driven to sample and hold the integral value INT_TSS of the touch sensing signal. The analog to digital converter (ADC) 341-4 may receive the integral value INT_TSS of the analog touch sensing signal to convert the integral value into the digital sensing data SD. At this time, the analog to digital converter (ADC) 341-4 may output a high level ADC active signal ADC_Active.

Further, while the ADC active signal ADC_Active is at a high level, the touch driving signal TDS may be generated using the second PWM signal $2^{nd}$ PWM and be output to a second touch electrode TE column. After a falling edge of the last pulse of the second PWM signal $2^{nd}$ PWM, the sample and hold circuit SHA of the second sensing unit 341-2 may be driven to sample and hold the integral value INT_TSS of the touch sensing signal. While the ADC active signal ADC_Active is at a high level, the analog to digital converter (ADC) 341-4 may receive the integral value INT_TSS of the analog touch sensing signal to convert the integral value into the digital sensing data SD.

Further, while the ADC active signal ADC_Active is at a high level, the touch driving signal TDS may be generated using the third PWM signal $3^{rd}$ PWM and be output to a third touch electrode TE column. After a falling edge of the last pulse of the third PWM signal $3^{rd}$ PWM, the sample and hold circuit SHA of the third sensing unit 341-2 may be driven to sample and hold the integral value INT_TSS of the touch sensing signal. While the ADC active signal ADC_Active is at a high level, the analog to digital converter (ADC) 341-4 may receive the integral value INT_TSS of the analog touch sensing signal to convert the integral value into the digital sensing data SD.

However, after outputting the third PWM signal $3^{rd}$ PWM, while the ADC active signal ADC_Active is at a high level, the synchronization signal Tsync may rise to a high level to switch from the touch sensing mode to the display mode. Therefore, while both the ADC active signal ADC_Active and the synchronization signal Tsync are at high levels, the comparator 345-1 may generate a high level overlap signal OS. The sampling control signal generator 345-2 applied with the high level overlap signal OS may generate a sampling control signal SCS to advance the sampling timing of the third PWM signal $3^{rd}$ PWM of a subsequent frame.

Therefore, as illustrated in FIG. 15B, during the second frame period $2^{nd}$ Frame, the first PWM signal 1st PWM, the second PWM signal 2nd PWM, and the third PWM signal 3rd PWM may be output with the same number of pulses (e.g., eight pulses in this example) as in the first frame period $1^{st}$ Frame. However, due to the sampling control signal SCS generated in the first frame period $1^{st}$ Frame which is a previous frame, after a falling edge of the next to the last pulse (e.g., the seventh pulse among the eight pulses in this example) of the third PWM signal $3^{rd}$ PWM of the second frame period $2^{nd}$ Frame, the sample and hold circuit SHA may perform the sampling. The PWM signal PWM including eight pulses is merely an example, and a different number of pulses may be implemented in PWM signals PWM. For example, the PWM signals may have N pulses where is a natural number of 1 or larger. In this case, after a falling edge of the (N−1)-th pulse of the third PWM signal $3^{rd}$ PWM, the sample and hold circuit SHA may perform the sampling.

Therefore, in this example, the sample and hold circuit SHA may sample and hold the integral value INT_TSS of the touch sensing signal corresponding to seven of the eight pulses of the third PWM signal $3^{rd}$ PWM. In other words, the sample and hold circuit SHA may sample and hold the integral value INT_TSS of the touch sensing signal corresponding to N−1 pulses among the N pulses of the third PWM signal $3^{rd}$ PWM. While the ADC active signal ADC_Active is at a high level, the analog to digital converter (ADC) 341-4 may receive the integral value INT_TSS of the analog touch sensing signal to convert the integral value into the digital sensing data SD.

However, after outputting the third PWM signal $3^{rd}$ PWM, while the ADC active signal ADC_Active is at a high level, the synchronization signal Tsync may rise to a high level to switch from the touch sensing mode to the display mode. Therefore, while both the ADC active signal ADC_Active and the synchronization signal Tsync are at high levels, the comparator 345-1 may generate a high level overlap signal OS. The sampling control signal generator 345-2 which is applied with the high level overlap signal OS may generate the sampling control signal SCS to advance a sampling timing of the third PWM signal $3^{rd}$ PWM of a subsequent frame (illustrated in FIG. 15C) or to advance a sampling timing of the second PWM signal $2^{nd}$ PWM in a subsequent frame (illustrated in FIG. 15D).

Therefore, as illustrated in FIG. 15C, during the third frame period $3^{rd}$ Frame, the first PWM signal $1^{st}$ PWM, the second PWM signal $2^{nd}$ PWM, and the third PWM signal $3^{rd}$ PWM may be output with eight pulses as in the first frame period $1^{st}$ Frame. However, due to the sampling control signal SCS being generated in the second frame period $2^{nd}$ Frame which is a previous frame, after a falling edge of the sixth pulse among the eight pulses of the third PWM signal $3^{rd}$ PWM of the third frame period $3^{rd}$ Frame, the sample and hold circuit SHA may perform the sampling. In other words, after a falling edge of the (N−2)-th pulse among the N pulses of the third PWM signal $3^{rd}$ PWM, the sample and hold circuit SHA may perform the sampling.

Therefore, in this example, the sample and hold circuit SHA may sample and hold the integral value INT_TSS of the touch sensing signal corresponding to six of the eight pulses of the third PWM signal $3^{rd}$ PWM. In other words, the sample and hold circuit SHA may sample and hold the integral value INT_TSS of the touch sensing signal corresponding to N−2 pulses among the N pulses of the third PWM signal $3^{rd}$ PWM. While the ADC active signal ADC_Active is at a high level, the analog to digital converter ADC 341-4 may receive the integral value INT_TSS of the analog touch sensing signal to convert the integral value into the digital sensing data SD.

Alternatively, as illustrated in FIG. 15D, during the third frame period $3^{rd}$ Frame, the first PWM signal $1^{st}$ PWM, the second PWM signal $2^{nd}$ PWM, and the third PWM signal $3^{rd}$ PWM may be output with eight pulses as in the first frame period $1^{st}$ Frame. However, due to the sampling control signal SCS being generated in the second frame period $2^{nd}$ Frame which is a previous frame, after a falling edge of the seventh pulse among the eight pulses of the second PWM signal $2^{nd}$ PWM of the third frame period $3^{rd}$ Frame, the sample and hold circuit SHA may perform the sampling. In other words, after a falling edge of the (N−1)-th pulse among the N pulses of the second PWM signal $2^{nd}$ PWM, the sample and hold circuit SHA may perform the sampling.

Therefore, in this alternative example, the sample and hold circuit SHA may sample and hold the integral value INT_TSS of the touch sensing signal corresponding to seven of the eight pulses of the second PWM signal $2^{nd}$ PWM. In other words, the sample and hold circuit SHA may sample and hold the integral value INT_TSS of the touch sensing signal corresponding to N−1 pulses among the N pulses of the second PWM signal 2nd PWM. While the ADC active signal ADC_Active is at a high level, the analog to digital converter ADC 341-4 may receive the integral value INT_TSS of the analog touch sensing signal to convert the integral value into the digital sensing data SD.

As illustrated in FIGS. 15C and 15D, after the third PWM signal $3^{rd}$ PWM is output, the ADC active signal ADC_Active may fall to a low level before the synchronization signal Tsync rises to a high level. Therefore, there is no period in which both the ADC active signal ADC_Active and the synchronization signal Tsync are at high levels in the third frame period, and the comparator 345-1 generates a low level overlap signal OS. With a low level overlap signal OS being applied, the sampling control signal generator 345-2 does not output the generated sampling control signal SCS, and the sampling timing is not advanced in the subsequent frame.

As described above, the sampling control circuit 345 of the touch display device according to still another example embodiment (a third example embodiment) of the present disclosure may adjust the sampling timing of the sample and hold circuit SHA to sequentially advance the period in which the analog to digital converter operates. By doing this, the operation of the analog to digital converter may be completed within the touch sensing period of the touch display device according to still another example embodiment (a third example embodiment) of the present disclosure.

As a result, also in the touch display device according to another example embodiment of the present disclosure (a third example embodiment), jitter in the digitally converted sensing data due to the source channel toggle for the display driving may be prevented or reduced so that the touch sensing performance may be improved.

Hereinafter, a touch display device according to still another example embodiment (a fourth example embodiment) of the present disclosure will be described. The touch display device according to another example embodiment (third example embodiment) of the present disclosure and a touch display device according to still another example embodiment (a fourth example embodiment) of the present disclosure are the same except that a compensator configured to compensate for sensing data is added in the fourth example embodiment. Hereinafter, a compensator of a touch display device according to still another example embodiment (a fourth example embodiment) of the present disclosure will be described in detail.

Figure 16:
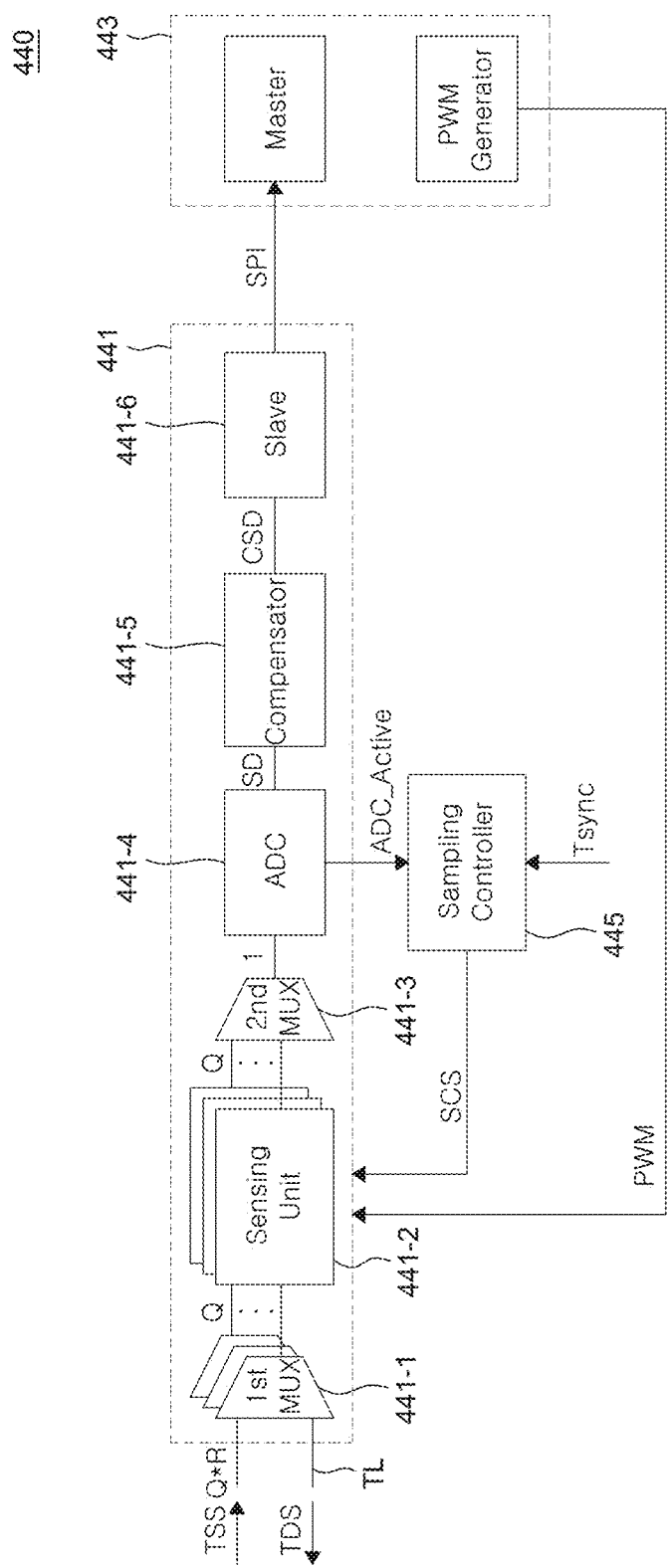
FIG. 16 is a diagram for explaining a touch driver of a touch display device according to still another example embodiment (a fourth example embodiment) of the present disclosure.

FIG. 16 is a diagram for explaining a touch driver of a touch display device according to still another example embodiment (a fourth example embodiment) of the present disclosure.

In the touch display device according to still another example embodiment (a fourth example embodiment) of the present disclosure, a touch driver 440 may include a touch sensing circuit 441, a touch control circuit 443, and a sampling control circuit 445.

The touch control circuit 443 and the sampling control circuit 445 may be the same as the touch control circuit 343 and the sampling control circuit 345 of the touch display device according to another example embodiment (a third example embodiment) of the present disclosure (e.g., as illustrated in FIG. 12). Thus, a redundant description may be omitted.

The touch sensing circuit 441 may detect a touch sensing signal TSS, which may vary depending on whether there is a touch, by driving the touch panel 113.

Specifically, the touch sensing circuit 441 may output a touch driving signal TDS to two or more touch electrodes TE and convert an analog touch sensing signal TSS detected by the touch electrodes TE applied with the touch driving signal TDS into digital sensing data SD to transmit the converted digital sensing data to the touch control circuit 443.

That is, the touch sensing circuit 441 may perform analog to digital conversion to convert the analog touch sensing signal TSS detected by each touch electrode TE applied with the touch driving signal TDS into digital sensing data SD.

In the touch display device according to still another example embodiment (a fourth example embodiment) of the present disclosure, the touch sensing circuit 441 may compensate for sensing data corresponding to a touch sensing signal which is not sampled in the plurality of sensing units 441-2.

Specifically, as illustrated in FIG. 16, the touch sensing circuit 441 may include a plurality of first multiplexers 441-1, a plurality of sensing units 441-2, a second multiplexer 441-3, an analog to digital converter (ADC) 441-4, a data compensator 441-5, and a slave processor 441-6.

Each of the plurality of first multiplexers 441-1 may select one touch sensing signal TSS among a plurality of touch sensing signals TSS output from one column of touch electrodes TE. Specifically, each of the plurality of first multiplexers 441-1 may be connected to a plurality of touch lines TL connected to one column of touch electrodes TE and perform a R:1 multiplexing. For example, Q first multiplexers 441-1 may select Q touch sensing signals TSS among touch sensing signals TSS received from the plurality of touch electrodes TE disposed in the Q×R matrix.

The plurality of sensing units 441-2 may integrate a plurality of touch sensing signals TSS, respectively, and each sample an integral value INT_TSS of the corresponding touch sensing signal. Each of the plurality of sensing units 441-2 may output the touch driving signal TDS to the corresponding touch electrode or electrodes TE of the touch panel 113.

Further, each of the plurality of sensing units 441-2 may be connected to a respective one of the plurality of first multiplexers 441-1 one-by-one to integrate the corresponding touch sensing signal TSS selected by the corresponding first multiplexer 441-1 or output the touch driving signal TDS through the corresponding first multiplexer 441-1.

For example, Q sensing units 441-2 may be connected to Q first multiplexers 441-1, respectively, on a one-to-one basis.

The second multiplexer 441-3 may select one touch sensing signal TSS among a plurality of touch sensing signals TSS output from the plurality of sensing units 441-2. Specifically, the second multiplexer 441-3 may be a circuit which is connected to the plurality of sensing units 441-2 and performs a Q:1 multiplexing. For example, the second multiplexer 441-3 may select one of Q sensing units 441-2 to input a voltage held in the sample and hold circuit SHA of the selected sensing unit 441-2 to the analog to digital converter (ADC) 441-4.

The analog to digital converter (ADC) 441-4 may convert the input voltage into digital sensing data SD to output the converted digital sensing data SD.

Further, during the period in which the analog to digital converter ADC 441-4 operates, the analog to digital converter ADC 441-4 may output a high level ADC active signal ADC_Active to the sampling control circuit 445.

Figure 17:
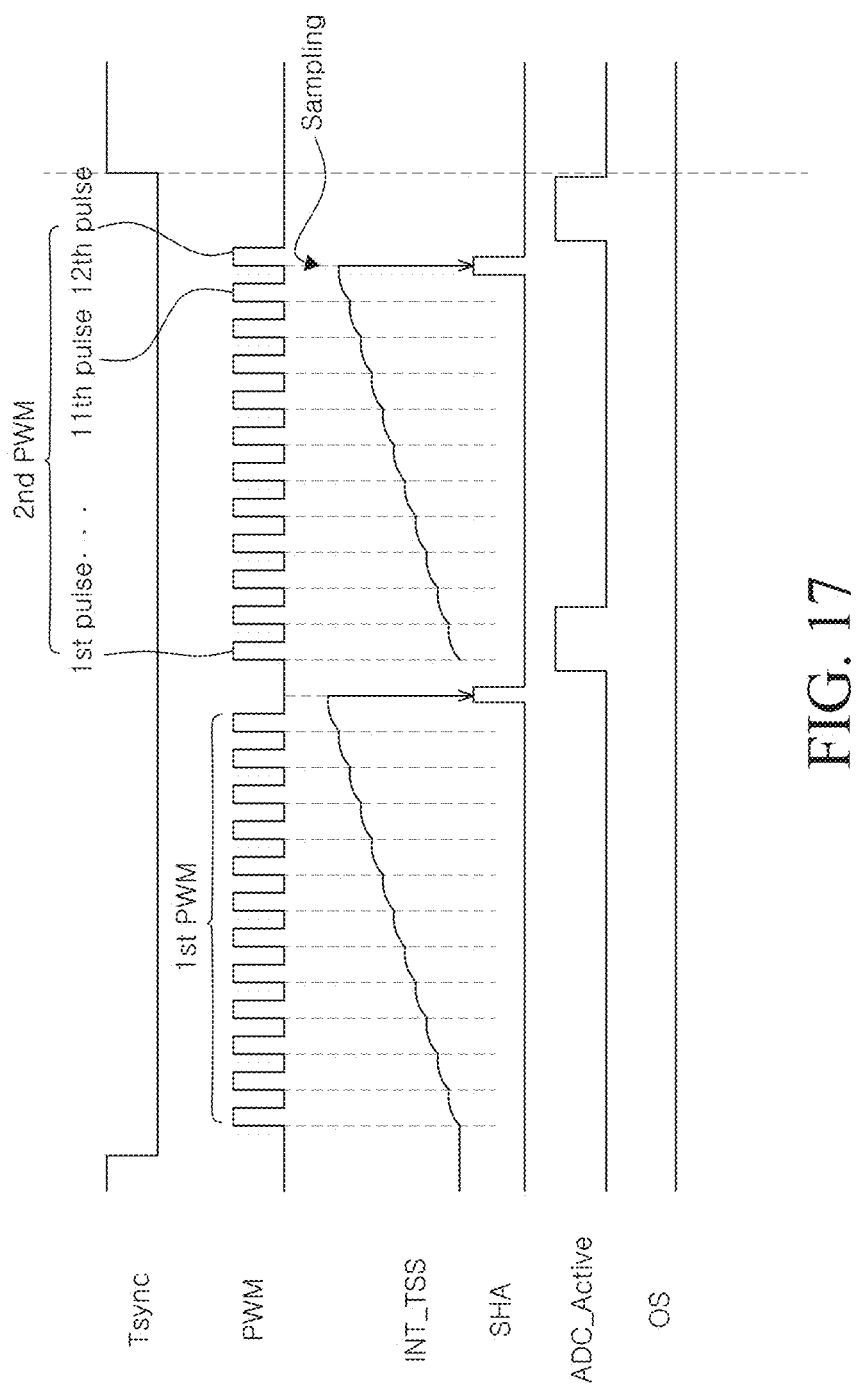
FIG. 17 is a timing diagram for explaining an operation of a data compensator of a touch display device according to another example embodiment (a fourth example embodiment) of the present disclosure.

FIG. 17 is a diagram for explaining an operation of a data compensator of a touch display device according to another example embodiment (a fourth example embodiment) of the present disclosure.

The data compensator 441-5 may compensate for the converted digital sensing data SD to generate digital compensated sensing data CSD.

As described above, the sampling control circuit 445 may not sample a touch sensing signal TSS corresponding to one or more of the pulses of the PWM signal PWM depending on whether the ADC active signal ADC_Active and the synchronization signal Tsync overlap. That is, as illustrated in FIG. 17, after a falling edge of an eleventh pulse among the twelve pulses of the second PWM signal $2^{nd}$ PWM, the sample and hold circuit SHA may perform the sampling. Therefore, the touch sensing signal TSS corresponding to a twelfth pulse, which in this example is the last pulse of the second PWM signal $2^{nd}$ PWM, may not be sampled.

Therefore, after calculating sensing data corresponding to the number of touch sensing signals which are not sampled, the data compensator 441-5 adds digital sensing data SD input from the analog to digital converter ADC 441-4 to the calculated sensing data (corresponding to the unsampled touch sensing signals) to generate digital compensated sensing data CSD.

For example, if sensing data SD corresponding to a first pulse to an eleventh pulse of the second PWM signal $2^{nd}$ PWM is 1100, an average sensing data for one pulse of the second PWM signal $2^{nd}$ PWM may be set to 100. That is, the sensing data corresponding to the unsampled touch sensing signal corresponding to the twelfth pulse may be set to 100.

Therefore, the data compensator 441-5 may add 100 (which is the sensing data corresponding to the unsampled touch sensing signal corresponding to the twelfth pulse) to 1100 (which is the sensing data SD corresponding to the first pulse to the eleventh pulse) to generate the compensated sensing data CSD.

The output digital compensated sensing data CSD may be transmitted to the touch control circuit 443 through the slave processor 441-6 of the touch sensing circuit 441.

In the touch display device according to another example embodiment (fourth example embodiment) of the present disclosure, the sensing data corresponding to the pulse of the PWM signal which is not sampled may be added to the sensing data to compensate for the digital sensing data.

Therefore, in the touch display device according to another example embodiment (fourth example embodiment) of the present disclosure, jitter may be prevented or reduced in the sensing data. Further, even though the sampling timing of the PWM signal is advanced, the sensing data may not be damaged.

As a result, the touch display device according to another example embodiment (fourth example embodiment) of the present disclosure may more accurately perform the touch sensing.

Hereinafter, a driving method of a touch display device according to still another example embodiment (a third example embodiment) of the present disclosure will be described in detail. The driving method of a touch display device according to still another example embodiment (a third example embodiment) of the present disclosure will be described based on the touch display device according to still another example embodiment (a third example embodiment) of the present disclosure described above.

Figure 18:
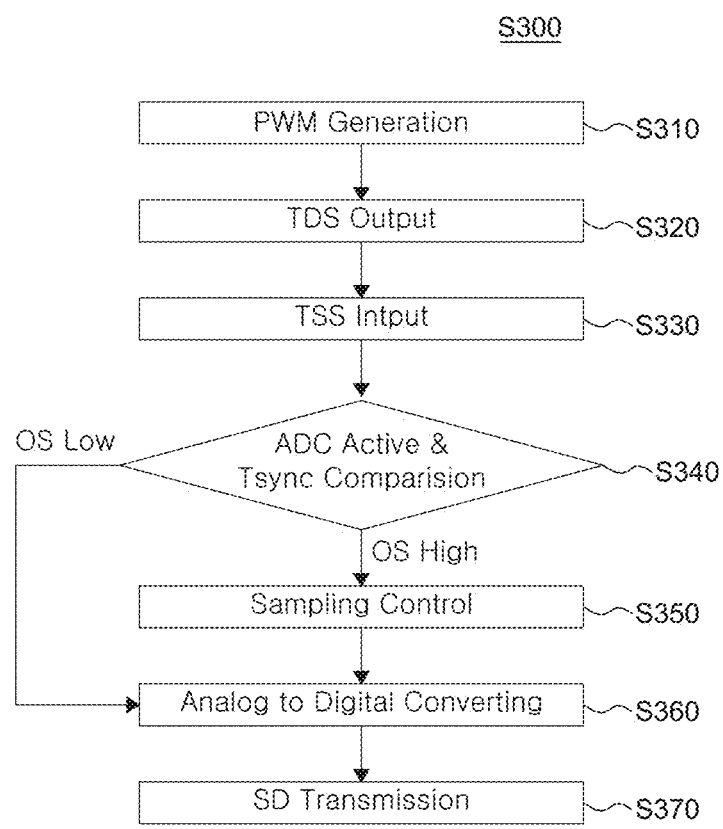
FIG. 18 is a flowchart for explaining a driving method of a touch display device according to another example embodiment (a third example embodiment) of the present disclosure.

FIG. 18 is a flowchart for explaining a driving method of a touch display device according to another example embodiment (a third example embodiment) of the present disclosure.

A driving method S300 of the touch display device according to another example embodiment (a third example embodiment) of the present disclosure may include a PWM generating step (PWM Generation) S310, a touch driving signal output step (TDS Output) S320, a touch sensing signal input step (TSS Input) S330, a signal comparing step (ADC_Active & Tsync Comparison) S340, a sampling control step (Sampling Control) S350, an analog to digital converting step (Analog to Digital Converting) S360, and a sensing data transmitting step (SD Transmission) S370.

In the PWM generating step (PWM Generation) S310, a PWM signal including a plurality of pulses may be generated.

Specifically, in the PWM generating step (PWM Generation) S310, a plurality of PWM signals including a plurality of pulses may be generated. For example, as illustrated in FIGS. 15A to 15D, a first PWM signal $1^{st}$ PWM, a second PWM signal $2^{nd}$ PWM, and a third PWM signal $3^{rd}$ PWM may be output.

In the touch driving signal output step (TDS output) S320, the PWM signal PWM may be output to the touch electrode (s) TE of the touch panel 113 as a touch driving signal TDS.

Specifically, the PWM signal PWM with no pulse removed may be output to each of the plurality of touch electrodes TE as a touch driving signal TDS in the touch driving signal output step (TDS Output) S320.

In the touch sensing signal input step (TSS Input) S330, the touch sensing circuit 341 may receive an analog touch sensing signal TSS from each touch electrode TE applied with the touch driving signal TDS.

In the signal comparing step (ADC_Active & Tsync Comparison) S340, the ADC active signal ADC_Active and the synchronization signal Tsync may be compared to determine whether the ADC active signal ADC_Active and the synchronization signal Tsync overlap.

In the signal comparing step (ADC_Active & Tsync Comparison) S340, as illustrated in FIGS. 15A and 15B for example, when both the ADC active signal ADC_Active and the synchronization signal Tsync are at high levels, a high level overlap signal OS may be generated. In this case, according to the sampling control step (Sampling Control) S350, a timing at which the integral value INT_TSS of the touch sensing signal is sampled may be controlled. Then, the sampled integral value INT_TSS may be held and, thereafter, the analog to digital converting step (Analog to Digital Converting) S360 may be performed.

As illustrated in FIGS. 15C and 15D for example, respectively, when any one of the ADC active signal ADC_Active and the synchronization signal Tsync is at a low level, a low level overlap signal OS may be generated. In this case, without the sampling control step (Sampling Control) S350 being performed, after sampling and holding the integral value INT_TSS of the touch sensing signal, the analog to digital converting step S360 may be performed.

In the sampling control step (Sampling Control) S350, if the overlap signal OS is at a high level, the sampling timing of the sample and hold circuit SHA may be advanced. Specifically, if the overlap signal OS is at a high level in the sampling control step S350, the sample and hold circuit SHA may be controlled to perform the sampling before outputting the last pulse of the plurality of pulses of the PWM signal PWM.

For example, as illustrated in FIGS. 15A and 15B, if the overlap signal OS is at a high level in the first frame period $1^{st}$ Frame, the integral value INT_TSS of the touch sensing signal may be sampled before the last pulse of the third PWM signal $3^{rd}$ PWM is output in the second frame period $2^{nd}$ Frame.

As another example, as illustrated in FIGS. 15B and 15C, if the overlap signal OS is at a high level in the second frame period $2^{nd}$ Frame, the integral value INT_TSS of the touch sensing signal may be sampled before the last pulse of the third PWM signal $3^{rd}$ PWM is output in the third frame period $3^{rd}$ Frame.

As another example, as illustrated in FIGS. 15B and 15D, if the overlap signal OS is at a high level in the second frame period 2nd Frame, the integral value INT_TSS of the touch sensing signal may be sampled before the last pulse of the second PWM signal $2^{nd}$ PWM is output in the third frame period 3rd Frame.

That is, in the sampling control step (Sampling Control) S350, the touch sensing signal TSS corresponding to at least one of the plurality of pulses of the PWM signal PWM is not sampled.

In the analog to digital converting step (Analog to Digital Converting) S360, the integral value INT_TSS of the analog touch sensing signal may be input to be converted into the digital sensing data SD.

In the sensing data transmitting step (SD Transmission) S370, the digital sensing data SD may be transmitted to determine touch information about the presence of touch and a touch position based on the digital sensing data SD.

The sensing data SD transmission may be implemented with a master-slave architecture, and the data may be transmitted and received by the communication interface I/F. The communication interface I/F may be a serial peripheral interface SPI.

As described above, in the sampling control step (Sampling Control) S350 of the driving method of the touch display device according to still another example embodiment (a third example embodiment) of the present disclosure, the sampling timing of the touch sensing signal TSS may be controlled depending on whether the ADC active signal ADC_Active and the synchronization signal Tsync overlap. By doing this, the timing of performing the analog to digital converting step (Analog to Digital Converting) S360 may be sequentially advanced. Therefore, in the driving method of the touch display device according to another example embodiment (a third example embodiment) of the present disclosure, the analog to digital converting step (Analog to Digital Converting) S360 may be completed within the touch sensing period. As a result, in the driving method of the touch display device according to another example embodiment (a third example embodiment) of the present disclosure, jitter in the digitally converted sensing data SD due to the source channel toggle for the display driving may be prevented or reduced so that the touch sensing performance may be improved.

Hereinafter, a driving method of a touch display device according to still another example embodiment (a fourth example embodiment) of the present disclosure will be described. The driving method of the touch display device according to another example embodiment (a third example embodiment) of the present disclosure (see, e.g., FIG. 18) and a driving method of a touch display device according to still another example embodiment (a fourth example embodiment) of the present disclosure may be the same except a sensing data compensating step and a compensated sensing data transmitting step. Hereinafter, the sensing data compensating step and the compensated sensing data transmitting step of the driving method of a touch display device according to another example embodiment (fourth example embodiment) of the present disclosure will be described in more detail.

Figure 19:
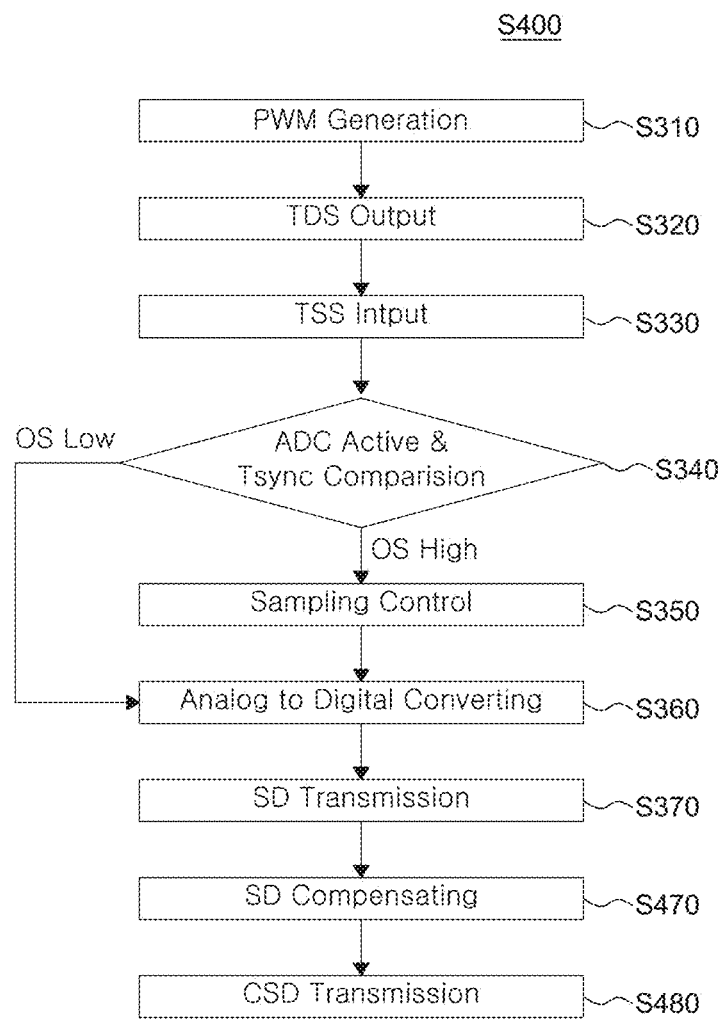
FIG. 19 is a flowchart for explaining a driving method of a touch display device according to another example embodiment (a fourth example embodiment) of the present disclosure.

FIG. 19 is a flowchart for explaining a driving method of a touch display device according to another example embodiment (a fourth example embodiment) of the present disclosure.

A driving method S400 of the touch display device according to another example embodiment (a fourth example embodiment) of the present disclosure may include a PWM generating step (PWM Generation) S310, a touch driving signal output step (TDS Output) S320, a touch sensing signal input step (TSS Input) S330, a signal comparing step (ADC_Active & Tsync Comparison) S340, a sampling control step (Sampling Control) S350, an analog to digital converting step (Analog to Digital Converting) S360, a sensing data compensating step (SD Compensating) S470, and a compensated sensing data transmitting step (CSD Transmission) S480.

The PWM generating step (PWM Generation) S310, the touch driving signal output step (TDS output) S320, the touch sensing signal input step (TSS Input) S330, the signal comparing step (ADC_Active & Tsync Comparison) S340, the sampling control step (Sampling Control) S350, and the analog to digital converting step (Analog to Digital Converting) S360 of the driving method S400 of the touch display device according to another example embodiment (a fourth example embodiment) of the present disclosure may be the same as those of the driving method of the touch display device according to another example embodiment (a third example embodiment) of the present disclosure. Therefore, a redundant description of these steps may be omitted.

In the sensing data compensating step (SD Compensating) S470, the digital sensing data SD converted in the analog to digital converting step (Analog to Digital Converting) S360 may be compensated to generate digital compensated sensing data CSD.

As described above, in the sampling control step (Sampling Control) S330, depending on whether the ADC active signal ADC_Active and the synchronization signal Tsync overlap, the sampling timing of the touch sensing signal TSS may be adjusted. That is, as illustrated in FIG. 17 for example, the touch sensing signal TSS corresponding to the last pulse of the second PWM signal $2^{nd}$ PWM may not be sampled.

Therefore, in the sensing data compensating step (SD Compensating) S470, after calculating sensing data corresponding to the number of touch sensing signals which are not sampled, that calculated sensing data may be added to the digital sensing data SD converted in the analog to digital converting step (Analog to Digital Converting) S360 to generate digital compensated sensing data CSD.

For example, if sensing data SD corresponding to a first pulse to an eleventh pulse of the second PWM signal $2^{nd}$ PWM is 1100, an average sensing data for one pulse of the second PWM signal 2nd PWM may be set to 100. That is, the sensing data corresponding to the unsampled touch sensing signal corresponding to the removed twelfth pulse (the last pulse of the second PWM signal $2^{nd}$ PWM in this example) may be set to 100.

Therefore, in the sensing data compensating step (SD Compensating) S470, 100 (which is the sensing data corresponding to the unsampled touch sensing signal corresponding to the twelfth pulse) is added to 1100 (which is the sensing data SD corresponding to the first pulse to the eleventh pulse) to generate the compensated sensing data CSD.

In the compensated sensing data transmitting step (CSD Transmission) S480, the digital compensated sensing data CSD may be transmitted to determine touch information about the presence of touch and a touch position based on the compensated sensing data CSD.

In the driving method of the touch display device according to another example embodiment (a fourth example embodiment) of the present disclosure, the sensing data corresponding to the pulse of the PWM signal which is not sampled may be added to the sensing data SD to compensate for the digital sensing data.

Therefore, in the driving method of the touch display device according to still another example embodiment (a fourth example embodiment) of the present disclosure, jitter may be prevented or reduced in the sensing data. Further, even though touch sensing signals corresponding to the PWM signal may be partially unsampled, the sensing data may not be damaged.

As a result, the driving method of the touch display device according to another example embodiment (a fourth example embodiment) of the present disclosure allows the touch sensing to be more accurately performed.

Hereinafter, a touch display device according to still another example embodiment (a fifth example embodiment) of the present disclosure will be described. A difference between the touch display device according to example embodiments of the present disclosure described above and a touch display device according to still another example embodiment (a fifth example embodiment) is whether a PWM modulator operates depending on different types of touches. Hereinafter, a PWM modulator of a touch display device according to still another example embodiment (a fifth example embodiment) of the present disclosure will be described in more detail.

Figure 20:
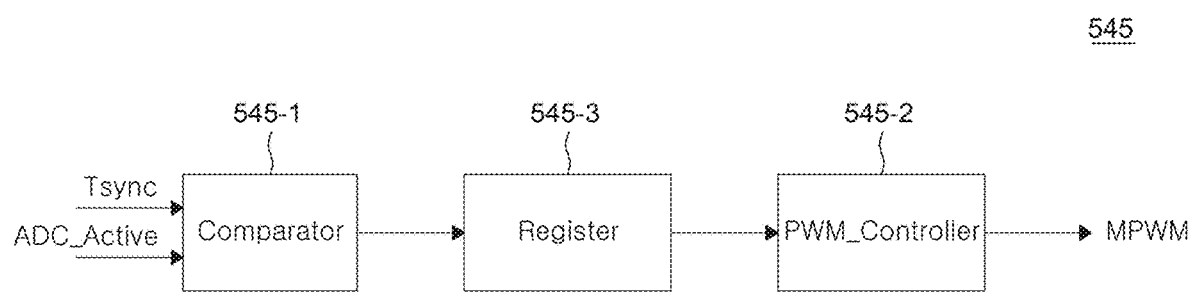
FIG. 20 is a diagram for explaining a PWM modulator of a touch display device according to still another example embodiment (a fifth example embodiment) of the present disclosure.

FIG. 20 is a diagram for explaining a PWM modulator of a touch display device according to still another example embodiment (a fifth example embodiment) of the present disclosure.

As illustrated in FIG. 20, a PWM modulator 545 according to still another example embodiment (a fifth example embodiment) of the present disclosure may include a comparator 545-1 configured to compare the ADC active signal ADC_Active and the synchronization signal Tsync to determine whether these signals overlap. The PWM modulator 545 may also include a PWM controller 545-2 to adjusts the number of pulses of the PWM signal PWM and a register 545-3 configured to determine whether the PWM controller is to modulate the PWM signal PWM.

The comparator 545-1 may be applied with the ADC active signal ADC_Active and the synchronization signal Tsync. When both the ADC active signal ADC_Active and the synchronization signal Tsync are at high levels, the comparator 545-1 may generate a high level overlap signal OS. When any one of the ADC active signal ADC_Active and the synchronization signal Tsync is at a low level, the comparator 545-1 may generate a low level overlap signal OS.

As illustrated in FIG. 3C, during each of the plurality of touch sensing periods (T1, T2, T3, T4, T5, and T6) within one frame, any one of pen position sensing, pen data sensing, and finger position sensing may be performed.

A frequency of a touch driving signal required for pen position sensing, a frequency of a touch driving signal required for pen data sensing, and a frequency required for finger position sensing may be different from each other. Therefore, frequencies of touch driving signals output in the first touch sensing period T1 and the fourth touch sensing period T4, frequencies of touch driving signals output in the second touch sensing period T2 and the fifth touch sensing period T5, and frequencies of touch driving signals output in the third touch sensing period T3 and the sixth touch sensing period T6 may be different from each other.

Therefore, overlap signals OS in the touch sensing periods T1 and T4 in which the pen position is sensed, overlap signals OS in the touch sensing periods T2 and T5 in which the pen data is sensed, and overlap signals OS in the touch sensing periods T3 and T6 in which the finger position is sensed may be different from each other.

The register 545-3 may store the overlap signal OS for every touch sensing period which performs sensing of different types of touches. That is, the register 545-3 may store a level of an overlap signal OS in the touch sensing periods T1 and T4 in which the pen position is sensed, a level of an overlap signal OS in the touch sensing periods T2 and T5 in which the pen data is sensed, and a level of an overlap signal OS in the touch sensing periods T3 and T6 in which the finger position is sensed.

The level of the overlap signal OS refers to a high level or a low level of the overlap signal OS output by the comparator 545-1 in each touch sensing period (T1, T2, T3, T4, T5, and T6) of a previous frame.

In other words, as shown in FIG. 3C, the register 545-3 may store a level of the overlap signal OS in the first touch sensing period T1 and the fourth touch sensing period T4, a level of the overlap signal OS in the second touch sensing period T2 and the fifth touch sensing period T5, and a level of the overlap signal OS in the third touch sensing period T3 and the sixth touch sensing period T6.

In some example embodiments, the register 545-3 may not store the overlap signal OS output from the comparator 545-1 but may autonomously store a setting value of the overlap signal OS.

If the overlap signal OS in each touch sensing period stored in the register 545-3 is at a high level, the PWM controller 545-2 may remove at least one of the plurality of pulses of the PWM signal PWM. Specifically, if the overlap signal OS in each touch sensing period stored in the register 545-3 is at a high level, the PWM controller 545-2 may sequentially remove the last pulse among the plurality of pulses of the PWM signal PWM.

Accordingly, the PWM controller 545-2 may remove or may not remove at least one of the plurality of pulses of the PWM signal PWM for every touch sensing period in which sensing of different types of touches is performed.

For example, if the overlap signal OS in the first touch sensing period T1 and the fourth touch sensing period T4 is stored as a low level, the overlap signal OS in the second touch sensing period T2 and the fifth touch sensing period T5 is stored as a high level, and the overlap signal OS in the third touch sensing period T3 and the sixth touch sensing period T6 is stored as a low level in the register 545-3, at least one pulse of the plurality of pulses of the PWM signal PWM may be removed only in the second touch sensing period T2 and the fifth touch sensing period T5.

That is, the touch display device according to still another example embodiment (a fifth example embodiment) of the present disclosure may determine whether to modulate the PWM signal for every touch sensing period in which sensing of different types of touches is performed.

Accordingly, the touch display device according to still another example embodiment (a fifth example embodiment) of the present disclosure may modulate the PWM signal suitable for one or more touch types so that it is possible to suppress any jitter that may be generated in the sensing data while reducing power consumption.

Hereinafter, a touch display device according to still another example embodiment (a sixth example embodiment) of the present disclosure will be described. The difference between the touch display device according to another example embodiment detailed above (e.g., the third or fourth example embodiment) and a touch display device according to still another example embodiment (a sixth example embodiment) of the present disclosure is an operation of the sampling control circuit according to different types of touches. Hereinafter, a sampling control circuit of a touch display device according to still another example embodiment (a sixth example embodiment) of the present disclosure will be described in more detail.

Figure 21:
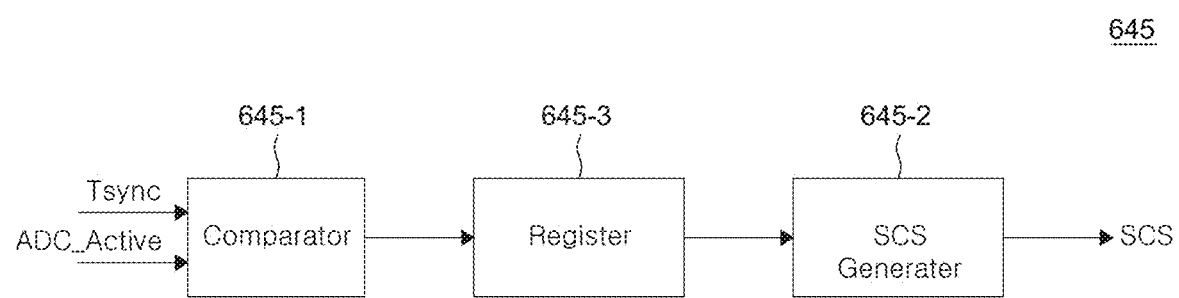
FIG. 21 is a diagram for explaining a sampling control circuit of a touch display device according to still another example embodiment (a sixth example embodiment) of the present disclosure.

FIG. 21 is a diagram for explaining a sampling control circuit of a touch display device according to still another example embodiment (a sixth example embodiment) of the present disclosure.

As illustrated in FIG. 21, a sampling control circuit 645 according to still another example embodiment (a sixth example embodiment) of the present disclosure may include a comparator 645-1 configured to compare the ADC active signal ADC_Active and the synchronization signal Tsync to determine whether the signals overlap. The sampling control circuit 645 may also include a sampling control signal generator (SCS_Generator) 645-2 configured to generate a sampling control signal SCS to control a sampling timing of a sample and hold circuit SHA and a register 645-3 configured to determine whether the sampling control signal generator is to generate a sampling control signal SCS.

The comparator 645-1 may be applied with the ADC active signal ADC_Active and the synchronization signal Tsync. When both the ADC active signal ADC_Active and the synchronization signal Tsync are at high levels, the comparator 645-1 may generate a high level overlap signal OS. When any one of the ADC active signal ADC_Active and the synchronization signal Tsync is at a low level, the comparator 645-1 may generate a low level overlap signal OS.

As illustrated in FIG. 3C, during each of the plurality of touch sensing periods T1, T2, T3, T4, T5, and T6 within one frame, any one of pen position sensing, pen data sensing, and finger position sensing may be performed.

A frequency of a touch driving signal required for pen position sensing, a frequency of a touch driving signal required for pen data sensing, and a frequency required for finger position sensing may be different from each other.

Therefore, frequencies of touch driving signals output in the first touch sensing period T1 and the fourth touch sensing period T4, frequencies of touch driving signals output in the second touch sensing period T2 and the fifth touch sensing period T5, and frequencies of touch driving signals output in the third touch sensing period T3 and the sixth touch sensing period T6 may be different from each other.

Therefore, overlap signals OS in the touch sensing periods T1 and T4 in which the pen position is sensed, overlap signals OS in the touch sensing periods T2 and T5 in which the pen data is sensed, and overlap signals OS in the touch sensing periods T3 and T6 in which the finger position is sensed may be different from each other.

The register 645-3 may store the overlap signal OS for every touch sensing period which performs sensing of different types of touches. That is, the register 645-3 may store a level of an overlap signal OS in the touch sensing periods T1 and T4 in which the pen position is sensed, a level of an overlap signal OS in the touch sensing periods T2 and T5 in which the pen data is sensed, and a level of an overlap signal OS in the touch sensing periods T3 and T6 in which the finger position is sensed.

In other words, as illustrated in FIG. 3C, the register 645-3 may store a level of the overlap signal OS in the first touch sensing period T1 and the fourth touch sensing period T4, a level of the overlap signal OS in the second touch sensing period T2 and the fifth touch sensing period T5, and a level of the overlap signal OS in the third touch sensing period T3 and the sixth touch sensing period T6.

In some example embodiments, the register 645-3 may not store the overlap signal OS output from the comparator 645-1 but may autonomously store a setting value of the overlap signal OS.

If the overlap signal OS in each touch sensing period stored in the register 645-3 is at a high level, the sampling control signal generator 645-2 may generate the sampling control signal SCS to control the sampling timing of the sample and hold circuit SHA. Specifically, if the overlap signal OS in each touch sensing period stored in the register 645-3 is at a high level, the sampling control signal generator 645-2 may generate a sampling control signal SCS to control the sample and hold circuit SHA to perform the sampling before the last pulse of the plurality of pulses of the PWM signal PWM is output.

Accordingly, the PWM controller 645-2 may or may not advance the sampling timing of the sample and hold circuit SHA for every touch sensing period in which sensing of different types of touches is performed.

For example, if the overlap signal OS in the first touch sensing period T1 and the fourth touch sensing period T4 is stored as a low level, the overlap signal OS in the second touch sensing period T2 and the fifth touch sensing period T5 is stored as a high level, and the overlap signal OS in the third touch sensing period T3 and the sixth touch sensing period T6 is stored as a low level in the register 645-3, the sampling timing of the sample and hold circuit SHA may be advanced only in the second touch sensing period T2 and the fifth touch sensing period T5.

That is, the touch display device according to still another example embodiment (a sixth example embodiment) of the present disclosure may determine whether to control the sampling timing for every touch sensing period in which sensing of different types of touches is performed.

Accordingly, the touch display device according to still another example embodiment (a sixth example embodiment) of the present disclosure may control the sampling timing suitable for one or more touch types so that it is possible to suppress any jitter that may be generated in the sensing data while reducing power consumption.

The example embodiments of the present disclosure can also be described as follows:

According to an aspect of the present disclosure, an example touch display device may comprise: a touch panel configured to be time-divisionally driven in at least one touch sensing period and at least one display period in each of a plurality of frames by a synchronization signal and including a plurality of touch electrodes; and a touch driver configured to drive the touch panel. The touch driver may include: a touch sensing circuit configured to supply a touch driving signal to each of the plurality of touch electrodes, to receive an analog touch sensing signal from each of the plurality of touch electrodes, and to sample an integral value of the analog touch sensing signal based on a sampling timing to output a digital sensing data; a touch control circuit configured to generate a pulse width modulation (PWM) signal having a plurality of pulses and to receive the digital sensing data to determine a touch, the touch driving signal being based on the PWM signal; and a timing control circuit configured to provide an output signal to the touch sensing circuit to control the sampling timing of the integral value of the analog touch sensing signal.

In the above example touch display device, the touch sensing circuit may include: a plurality of sensing units configured to integrate the analog touch sensing signal and to sample the integral value of the analog touch sensing signal; and an analog to digital converter (ADC) configured to convert the integral value of the analog touch sensing signal into the digital sensing data.

In the above example touch display device, each of the plurality of sensing units above may include: a preamplifier configured to output the touch driving signal to the plurality of touch electrodes; an integrator configured to integrate the analog touch sensing signal to generate the integral value of the analog touch sensing signal; and a sample and hold circuit configured to sample and hold the integral value of the analog touch sensing signal.

In the above example touch display device, the plurality of frames above may include at least a first frame and a second frame following the first frame. Also, the touch driving signal may be the PWM signal. Further, the timing control circuit above may include a sampling controller, and the output signal of the timing control circuit may be a sampling control signal. In addition, if an operation period of the analog to digital converter (ADC) overlaps the at least one display period in the first frame, the sampling controller may be configured to output the sampling control signal to the sample and hold circuit to advance the sampling timing of the integral value of the analog touch sensing signal in at least one touch sensing period in the second frame.

In the above example touch display device, the plurality of frames includes at least a first frame and a second frame following the first frame. Also, the timing control circuit may include a PWM modulator configured to modify the PWM signal. Further, if an operation period of the analog to digital converter (ADC) overlaps the at least one display period in the first frame, the PWM modulator may be configured to modify a number of pulses in the PWM signal to generate a modified PWM signal, and to provide the modified PWM signal as the output signal of the timing control circuit to the touch sensing circuit to advance the sampling timing of the integral value of the analog touch sensing signal in at least one touch sensing period in the second frame, the modified PWM signal being the touch driving signal in the at least one touch sensing period in the second frame.

In the above example touch display device, the analog to digital converter (ADC) may be configured to output an ADC active signal which is at a first level for the ADC active signal while converting the integral value of the analog touch sensing signal into the digital sensing data. Also, the synchronization signal may be configured to be at a first level for the synchronization signal in the at least one display period and at a second level for the synchronization signal in the at least one touch sensing period.

In the above example touch display device, the timing control circuit may include: a comparator configured to output an overlap signal based on whether the ADC active signal and the synchronization signal are both at their respective first levels; and an output signal generator configured to generate the output signal of the timing control circuit based on the overlap signal.

In the above example touch display device, the overlap signal may be configured to be: at a first level for the overlap signal if both the ADC active signal and the synchronization signal are at their respective first levels, and at a second level for the overlap signal otherwise.

In the above example touch display device, the at least one touch sensing period may include a plurality of touch sensing periods, and the timing control circuit may further include a register configured to store the overlap signal for each of the plurality of touch sensing periods within at least one of the plurality of frames in which the touch driver is configured to determine different types of touches.

In the above example touch display device, the control signal generator may include a sample control signal generator configured to output a sampling control signal as the output signal of the timing control circuit based on the overlap signal.

In the above example touch display device, the control signal generator may include a PWM controller configured to modify a number of pulses in the PWM signal to provide a modified PWM signal as the output signal of the timing control circuit based on the overlap signal.

In the above example touch display device, the touch sensing circuit may further include: a data compensator configured to compensate for the digital sensing data output from the analog to digital converter to generate a digital compensated sensing data.

In the above example touch display device, the data compensator may be configured to determine a sensing data corresponding to a touch sensing signal not sampled by the sensing units and to add the sensing data to the digital sensing data from the analog to digital converter (ADC) to generate the digital compensated sensing data.

According to another aspect of the present disclosure, for an example touch display device which comprises a touch panel configured to be time-divisionally driven into at least one touch sensing period and at least one display period in each of a plurality of frames by a synchronization signal and including a plurality of touch electrodes, and a touch driver configured to drive the touch panel, an example method of driving may comprise: generating a pulse width modulation (PWM) signal including a plurality of pulses; outputting a touch driving signal to each of the plurality of touch electrodes, the touch driving signal being based on the PWM signal; receiving an analog touch sensing signal from each of the plurality of touch electrodes; sampling an integral value of the analog touch sensing signal based on a sampling timing and outputting a digital sensing data; determining a touch based on the digital sensing data; and controlling the sampling timing of the integral value of the analog touch sensing signal.

In the above example method, the outputting of the digital sensing data may include converting the integral value of the analog touch sensing signal into the digital sensing data.

The above example method may further comprise determining whether the converting of the integral value of the analog touch sensing signal into the digital sensing data overlaps in time with the at least one display period. In this example, the plurality of frames may include at least a first frame and a second frame following the first frame. Also, the touch driving signal may be the PWM signal. Further, if the converting of the integral value of the analog touch sensing signal into the digital sensing data is determined to overlap in time with the at least one display period in the first frame, the controlling of the sampling timing may include advancing the sampling timing to sample the integral value of the analog touch sensing signal before the last of the plurality of pulses of the PWM signal is output in at least one touch sensing period in the second frame.

The above example method may further comprise determining whether the converting of the integral value of the analog touch sensing signal into the digital sensing data overlaps in time with the at least one display period. In this example, the plurality of frames may include at least a first frame and a second frame following the first frame. Also, if the converting of the integral value of the analog touch sensing signal into the digital sensing data is determined to overlap in time with the at least one display period in the first frame, the controlling of the sampling timing may include modifying a number of pulses in the PWM signal to generate a modified PWM signal as the touch driving signal to advance the sampling timing of the integral value of the analog touch sensing signal in at least one touch sensing period in the second frame.

The above example method may further comprise outputting an ADC active signal which is at a first level for the ADC active signal during the converting of the integral value of the analog touch sensing signal into the digital sensing data. In this example, the synchronization signal may be configured to be at a first level for the synchronization signal in the at least one display period and at a second level for the synchronization signal in the at least one touch sensing period.

The above example method may further comprise outputting an overlap signal based on whether the ADC active signal and the synchronization signal are at their respective first levels. In this example, the overlap signal may be: at a first level for the overlap signal if the ADC active signal and the synchronization signal are at their respective first levels, and at a second level for the overlap signal otherwise. Also, controlling of the sampling timing may include advancing the sampling timing of the integral value of the analog touch sensing signal if the overlap signal is at the first level for the overlap signal.

The above example method may further comprise: determining a sensing data corresponding to a touch sensing signal that corresponds to the last of the plurality of pulses of the PWM signal and is not sampled in the sampling of the integral value, and adding the sensing data to the digital sensing data to generate a compensated sensing data. In this example, the controlling of the sampling timing may include advancing the sampling timing so that the touch sensing signal corresponding to the last of the plurality of pulses of the PWM signal is not sampled. Also, the determining of a touch may include determining presence of a touch and a touch position based on the compensated sensing data.

In the above example method, the determining of a touch may include determining presence of a touch and a touch position based on the digital sensing data.

In the above example method, the at least one touch sensing period may include a plurality of touch sensing periods, and the determining of a touch may include respectively determining different types of touches in the plurality of touch sensing periods in at least one of the plurality of frames.

Although the example embodiments of the present disclosure have been described in detail with reference to the accompanying drawings, the present disclosure is not limited thereto and may be embodied in many different forms without departing from the technical concept of the present disclosure. Therefore, the example embodiments of the present disclosure are provided for illustrative purposes only and are not intended to limit the technical concept of the present disclosure. The scope of the technical concept of the present disclosure is not limited thereto. Therefore, it should be understood that the above-described example embodiments are illustrative in all aspects and do not limit the present disclosure. The protective scope of the present disclosure should be construed based on the following claims, and all the technical concepts in the equivalent scope thereof should be construed as falling within the scope of the present disclosure.

It will be apparent to those skilled in the art that various modifications and variations can be made in the touch display device and method of driving the same of the present disclosure without departing from the spirit or scope of the disclosure. Thus, it is intended that the present disclosure cover the modifications and variations of this disclosure provided they come within the scope of the appended claims and their equivalents.

What is claimed is:
1. A touch display device, comprising:
 a touch panel configured to be time-divisionally driven in at least one touch sensing period and at least one display period in each of a plurality of frames by a synchronization signal and including a plurality of touch electrodes; and
 a touch driver configured to drive the touch panel, the touch driver including:
  a touch sensing circuit configured to supply a touch driving signal to each of the plurality of touch electrodes, to receive an analog touch sensing signal from each of the plurality of touch electrodes, and to sample an integral value of the analog touch sensing signal based on a sampling timing to output a digital sensing data;
  a touch control circuit configured to generate a pulse width modulation (PWM) signal having a plurality of pulses and to receive the digital sensing data to determine a touch, the touch driving signal being based on the PWM signal; and
  a timing control circuit configured to provide an output signal to the touch sensing circuit to adjust the sampling timing of the integral value of the analog touch sensing signal,
 wherein:
 the touch sensing circuit includes an analog to digital converter (ADC) configured to convert the integral value of the analog touch sensing signal into the digital sensing data, the plurality of frames includes at least a first frame and a second frame following the first frame, and if an operation period of the analog to digital converter (ADC) overlaps the at least one display period in the first frame, the timing control circuit is configured to provide the output signal to the touch sensing circuit to advance the sampling timing of the integral value of the analog touch sensing signal in the second frame.

2. The touch display device of claim 1, wherein the touch sensing circuit includes:

a plurality of sensing units configured to integrate the analog touch sensing signal and to sample the integral value of the analog touch sensing signal.

3. The touch display device of claim 2, wherein each of the plurality of sensing units includes:

a preamplifier configured to output the touch driving signal to the plurality of touch electrodes;

an integrator configured to integrate the analog touch sensing signal to generate the integral value of the analog touch sensing signal; and a sample and hold circuit configured to sample and hold the integral value of the analog touch sensing signal.

4. The touch display device of claim 3, wherein:

the touch driving signal is the PWM signal;

the timing control circuit includes a sampling controller, and the output signal of the timing control circuit is a sampling control signal; and if an operation period of the analog to digital converter (ADC) overlaps the at least one display period in the first frame, the sampling controller is configured to output the sampling control signal to the sample and hold circuit to advance the sampling timing of the integral value of the analog touch sensing signal in at least one touch sensing period in the second frame.

5. The touch display device of claim 3, wherein:

the timing control circuit includes a PWM modulator configured to modify the PWM signal; and if an operation period of the analog to digital converter (ADC) overlaps the at least one display period in the first frame, the PWM modulator is configured to modify a number of pulses in the PWM signal to generate a modified PWM signal, and to provide the modified PWM signal as the output signal of the timing control circuit to the touch sensing circuit to advance the sampling timing of the integral value of the analog touch sensing signal in at least one touch sensing period in the second frame, the modified PWM signal being the touch driving signal in the at least one touch sensing period in the second frame.

6. A touch display device, comprising:

a touch panel configured to be time-divisionally driven in at least one touch sensing period and at least one display period in each of a plurality of frames by a synchronization signal and including a plurality of touch electrodes; and a touch driver configured to drive the touch panel, the touch driver including:

a touch sensing circuit configured to supply a touch driving signal to each of the plurality of touch electrodes, to receive an analog touch sensing signal from each of the plurality of touch electrodes, and to sample an integral value of the analog touch sensing signal based on a sampling timing to output a digital sensing data;

a touch control circuit configured to generate a pulse width modulation (PWM) signal having a plurality of pulses and to receive the digital sensing data to determine a touch, the touch driving signal being based on the PWM signal; and a timing control circuit configured to provide an output signal to the touch sensing circuit to control the sampling timing of the integral value of the analog touch sensing signal, wherein the touch sensing circuit includes an analog to digital converter (ADC) configured to convert the integral value of the analog touch sensing signal into the digital sensing data, wherein the analog to digital converter (ADC) is configured to output an ADC active signal which is at a first level for the ADC active signal while converting the integral value of the analog touch sensing signal into the digital sensing data, and wherein the synchronization signal is configured to be at a first level for the synchronization signal in the at least one display period and at a second level for the synchronization signal in the at least one touch sensing period.

7. The touch display device of claim 6, wherein the timing control circuit includes:

a comparator configured to output an overlap signal based on whether the ADC active signal and the synchronization signal are both at their respective first levels; and an output signal generator configured to generate the output signal of the timing control circuit based on the overlap signal.

8. The touch display device of claim 7, wherein the overlap signal is configured to be:

at a first level for the overlap signal if both the ADC active signal and the synchronization signal are at their respective first levels, and at a second level for the overlap signal otherwise.

9. The touch display device of claim 8, wherein the at least one touch sensing period includes a plurality of touch sensing periods, and wherein the timing control circuit further includes a register configured to store the overlap signal for each of the plurality of touch sensing periods within at least one of the plurality of frames in which the touch driver is configured to determine different types of touches.

10. The touch display device of claim 7, wherein the output signal generator includes a sample control signal generator configured to output a sampling control signal as the output signal of the timing control circuit based on the overlap signal.

11. The touch display device of claim 7, wherein the output signal generator includes a PWM controller configured to modify a number of pulses in the PWM signal to provide a modified PWM signal as the output signal of the timing control circuit based on the overlap signal.

12. The touch display device of claim 2, wherein the touch sensing circuit further includes:

a data compensator configured to compensate for the digital sensing data output from the analog to digital converter to generate a digital compensated sensing data.

13. The touch display device of claim 12, wherein the data compensator is configured to determine a sensing data corresponding to a touch sensing signal not sampled by the sensing units and to add the sensing data to the digital sensing data from the analog to digital converter (ADC) to generate the digital compensated sensing data.

14. A method of driving a touch display device which comprises a touch panel configured to be time-divisionally driven into at least one touch sensing period and at least one display period in each of a plurality of frames by a synchronization signal and including a plurality of touch electrodes, and a touch driver configured to drive the touch panel, the method comprising:
generating a pulse width modulation (PWM) signal including a plurality of pulses;
outputting a touch driving signal to each of the plurality of touch electrodes, the touch driving signal being based on the PWM signal;
receiving an analog touch sensing signal from each of the plurality of touch electrodes;
sampling an integral value of the analog touch sensing signal based on a sampling timing and outputting a digital sensing data;
determining a touch based on the digital sensing data; and
adjusting the sampling timing of the integral value of the analog touch sensing signal,
wherein:
the outputting of the digital sensing data includes converting the integral value of the analog touch sensing signal into the digital sensing data,
the plurality of frames includes at least a first frame and a second frame following the first frame, and
the modifying of the sampling timing includes advancing the sampling timing of the integral value of the analog touch sensing signal in the second frame if the converting of the integral value of the analog touch sensing signal into the digital sensing data overlaps in time with the at least one display period in the first frame.

15. The method of claim 14, further comprising:
determining whether the converting of the integral value of the analog touch sensing signal into the digital sensing data overlaps in time with the at least one display period,
wherein:
the touch driving signal is the PWM signal; and
if the converting of the integral value of the analog touch sensing signal into the digital sensing data is determined to overlap in time with the at least one display period in the first frame, the adjusting of the sampling timing includes advancing the sampling timing to sample the integral value of the analog touch sensing signal before the last of the plurality of pulses of the PWM signal is output in at least one touch sensing period in the second frame.

16. The method of claim 14, further comprising:
determining whether the converting of the integral value of the analog touch sensing signal into the digital sensing data overlaps in time with the at least one display period,
wherein:
if the converting of the integral value of the analog touch sensing signal into the digital sensing data is determined to overlap in time with the at least one display period in the first frame, the adjusting of the sampling timing includes modifying a number of pulses in the PWM signal to generate a modified PWM signal as the touch driving signal to advance the sampling timing of the integral value of the analog touch sensing signal in at least one touch sensing period in the second frame.

17. The method of claim 14, further comprising:
outputting an ADC active signal which is at a first level for the ADC active signal during the converting of the integral value of the analog touch sensing signal into the digital sensing data,
wherein the synchronization signal is configured to be at a first level for the synchronization signal in the at least one display period and at a second level for the synchronization signal in the at least one touch sensing period.

18. The method of claim 17, further comprising:
outputting an overlap signal based on whether the ADC active signal and the synchronization signal are at their respective first levels, the overlap signal being:
at a first level for the overlap signal if the ADC active signal and the synchronization signal are at their respective first levels, and
at a second level for the overlap signal otherwise, and
wherein the adjusting of the sampling timing includes advancing the sampling timing of the integral value of the analog touch sensing signal if the overlap signal is at the first level for the overlap signal.

19. The method of claim 14, further comprising:
determining a sensing data corresponding to a touch sensing signal that corresponds to the last of the plurality of pulses of the PWM signal and is not sampled in the sampling of the integral value, and
adding the sensing data to the digital sensing data to generate a compensated sensing data,
wherein the controlling of the sampling timing includes advancing the sampling timing so that the touch sensing signal corresponding to the last of the plurality of pulses of the PWM signal is not sampled, and
wherein the determining of a touch includes determining presence of a touch and a touch position based on the compensated sensing data.

20. The method of claim 14, wherein the determining of a touch includes determining presence of a touch and a touch position based on the digital sensing data.

21. The method of claim 14, wherein the at least one touch sensing period includes a plurality of touch sensing periods, and
wherein the determining of a touch includes respectively determining different types of touches in the plurality of touch sensing periods in at least one of the plurality of frames.

* * * * *